US010430872B2

(12) United States Patent
Wilkinson et al.

(10) Patent No.: US 10,430,872 B2
(45) Date of Patent: Oct. 1, 2019

(54) METHOD OF VALUATION OF GEOLOGICAL ASSET OR INFORMATION RELATING THERETO IN THE PRESENCE OF UNCERTAINTIES

(71) Applicant: SCHLUMBERGER TECHNOLOGY CORPORATION, Sugar Land, TX (US)

(72) Inventors: David J. Wilkinson, Ridgefield, CT (US); Nikita Chugunov, Arlington, MA (US); William J. Bailey, Somerville, MA (US); Benoit Couet, Belmont, MA (US); Terizhandur S. Ramakrishnan, Boxborough, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 656 days.

(21) Appl. No.: 13/784,666

(22) Filed: Mar. 4, 2013

(65) Prior Publication Data
US 2013/0304617 A1    Nov. 14, 2013

Related U.S. Application Data

(60) Provisional application No. 61/645,466, filed on May 10, 2012.

(51) Int. Cl.
*G06Q 40/00*    (2012.01)
*G06Q 10/06*    (2012.01)

(52) U.S. Cl.
CPC ............. *G06Q 40/00* (2013.01); *G06Q 10/06* (2013.01)

(58) Field of Classification Search
CPC ......... G06Q 40/00; G06Q 40/06; G06Q 10/06
(Continued)

(56) References Cited

U.S. PATENT DOCUMENTS 5,842,158 A * 11/1998 Plasek ........................... 702/195
6,775,578 B2 * 8/2004 Couet et al. ................... 700/28
(Continued)

OTHER PUBLICATIONS

Hull, "A General Approach to Pricing Derivative Securities," Options, Futures, and other Derivative Securities, Second Edition, Prentice-Hall, Inc.: New Jersey, ed. Riker, 1993: pp. 282-287.
(Continued)

*Primary Examiner* — Lalita M Hamilton

(57) ABSTRACT

Methods are disclosed for assigning a value to a geological asset or information relating thereto in the presence of private and public sources of uncertainties. The private and public uncertainties associated with a geological asset or information associated therewith are defined, and private uncertainties are assigned a subjective probability representing the best state of knowledge currently available. A multi-dimensional valuation-time lattice is constructed using the subjective probabilities for the private uncertainties and using risk-neutral probabilities for the public uncertainties. A backward recursion through the multi-dimensional lattice is performed in order to generate a present value for the asset given the present information available. During the backward recursion, a tally of delta hedging coefficients is generated and stored in order to provide an operational "map" or "decision pathway" should the project move forward.

21 Claims, 9 Drawing Sheets

(58) Field of Classification Search
USPC ...... 705/2, 3, 6, 10, 35, 36 R; 703/2; 700/28
See application file for complete search history.

(56) References Cited

U.S. PATENT DOCUMENTS

| | | | |
|---|---|---|---|
| 6,932,155 B2* | 8/2005 | Vinegar et al. | 166/245 |
| 7,801,789 B1* | 9/2010 | Cohler et al. | 705/36 R |
| 7,822,668 B1* | 10/2010 | Benda | 705/36 R |
| 8,600,708 B1* | 12/2013 | Mallet et al. | 703/2 |
| 9,051,822 B2* | 6/2015 | Ayan et al. | |
| 2002/0073007 A1* | 6/2002 | Ayache | 705/36 |
| 2004/0268338 A1* | 12/2004 | Gurpinar et al. | 717/169 |
| 2009/0260880 A1* | 10/2009 | Thambynayagam et al. | 175/45 |
| 2009/0271233 A1* | 10/2009 | Prange et al. | 705/7 |
| 2010/0299126 A1* | 11/2010 | Chugunov et al. | 703/10 |
| 2010/0332275 A1* | 12/2010 | Walsh et al. | 705/7 |
| 2011/0307230 A1* | 12/2011 | Lee et al. | 703/10 |
| 2013/0110483 A1 | 5/2013 | Chugunov et al. | |
| 2013/0124162 A1* | 5/2013 | Hu et al. | 703/2 |

OTHER PUBLICATIONS

Luenberger, "Chapter 16: General Investment Evaluation," Investment Science, Oxford University Press: New York, 1998: pp. 444-474.

* cited by examiner

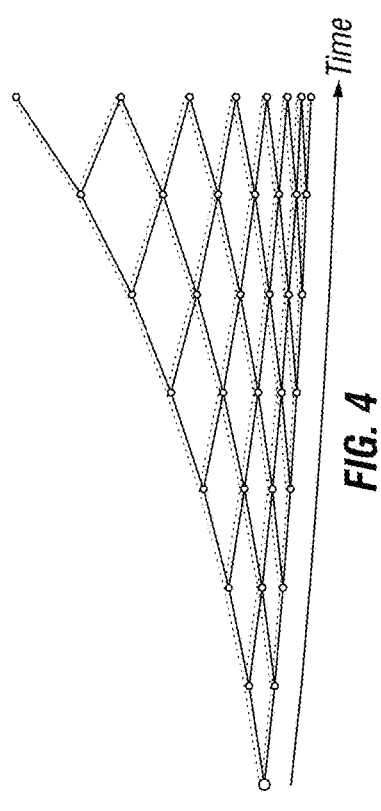
FIG. 4
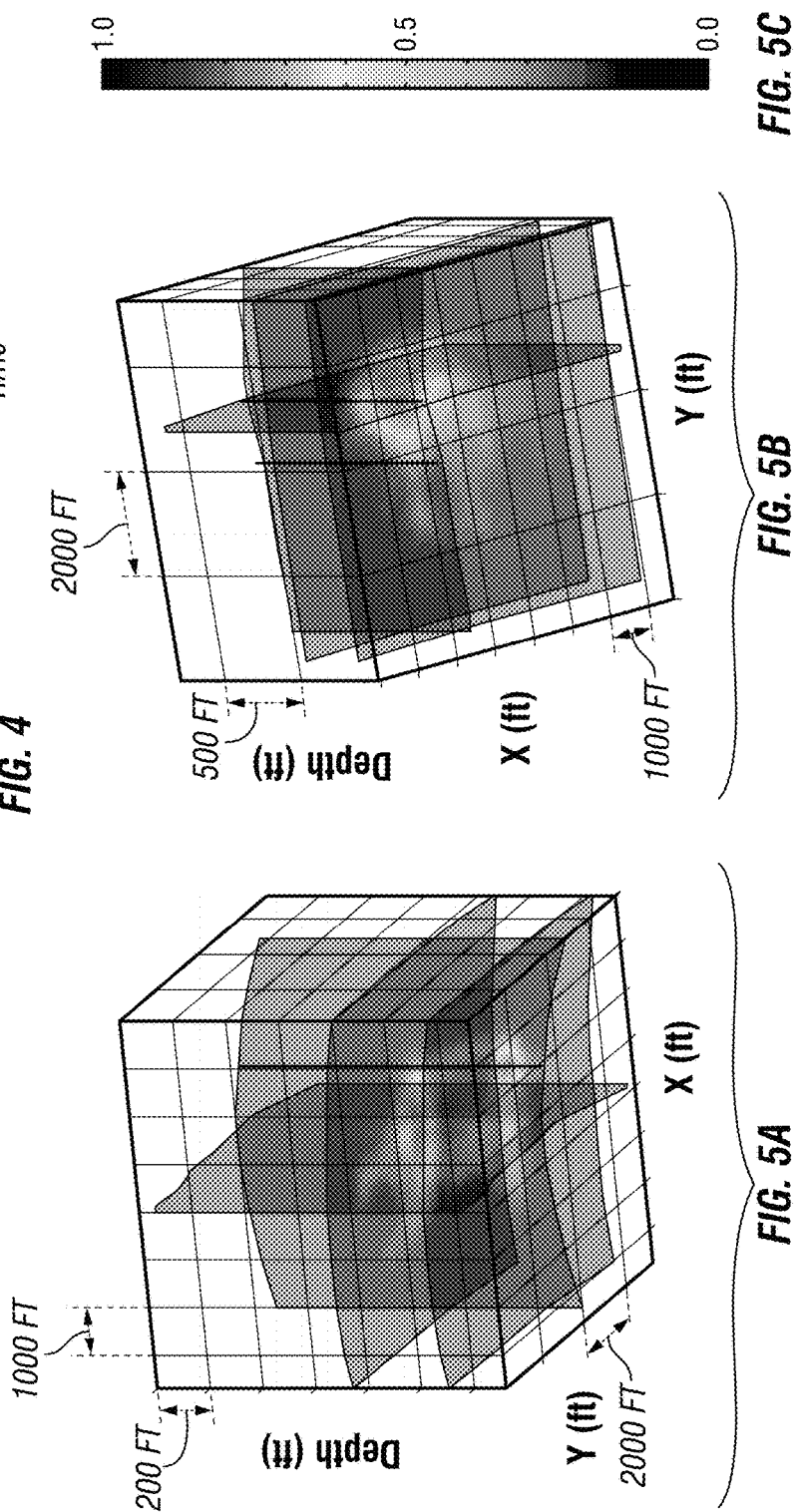
FIG. 5A
FIG. 5B
FIG. 5C

Backward recursion: $t_3 \rightarrow t_2$

Backward recursion: $t_2 \rightarrow t_1$

Backward recursion: $t_1 \rightarrow t_0$

METHOD OF VALUATION OF GEOLOGICAL ASSET OR INFORMATION RELATING THERETO IN THE PRESENCE OF UNCERTAINTIES

CROSS-REFERENCE TO RELATED APPLICATION

This application claims the benefit of U.S. Provisional Patent Application Ser. No. 61/645,466 filed May 10, 2012, which is incorporated herein by reference in its entirety.

BACKGROUND

Field of the Invention

This case relates to methods for assigning a specific value to a geological asset or information relating thereto in the presence of multiple sources of uncertainties. Although not limited thereto, this case has particular application to assigning values to a wide range of geological assets such as a hydrocarbon-bearing geological formation, a property adjacent a carbon dioxide sequestration-project or an option to buy that property, and information obtainable from a monitoring well adjacent a carbon dioxide sequestration-project.

State of the Art

This case relates to methods for assigning a specific value to a geological asset or information relating thereto in the presence of multiple sources of uncertainties. Although not limited thereto, this case has particular application to assigning values to a wide range of geological assets such as a hydrocarbon-bearing geological formation, a property adjacent a carbon dioxide sequestration-project or an option to buy that property, and information obtainable from a monitoring well adjacent a carbon dioxide sequestration-project.

One aspect of formation characterization relates to the geological makeup of the formation. While formation rock-samples (e.g., cores) may be obtained downhole and brought uphole for evaluation in a surface laboratory to obtain data, in some cases the delay results in mistakes made in well-development. Such error may be avoided or at least predicted with real-time data.

Assessment of the value of real property is necessary, inter alia, for buying, selling and taxation. Where the real property involves a geological asset, i.e., subsurface tangibles contained within the formation, the assessment may depend upon many unknowns resulting in uncertainties. For example, in developing a geological area believed to contain hydrocarbons such as oil and gas, a determination of whether or how to produce the hydrocarbons is dependent upon many factors including the size of the field, resource and reserve content, the location, the permeability of the rock within which the hydrocarbon is located, the hydrocarbon quality, etc. It is therefore common to drill exploratory wells and run tests in order to obtain information that can ascertain the value of the reservoir within reasonable uncertainty and permit a determination of whether or how to produce the hydrocarbons. Similarly, where a formation might be believed suitable for the sequestration of carbon dioxide or other materials (e.g., radioactive materials), a determination of whether or how to sequester the material downhole may be dependent upon many factors such as whether the formation has impermeable cap layers, the size and location of the site, etc. Therefore, it may be useful to run tests to reduce uncertainties associated with the sequestration in order to permit a determination of whether or how to sequester the materials.

Since information procurement for reducing uncertainty has costs, it is useful to be able to accurately assess the value of potential information so that appropriate decisions can be made as to whether or not to undertake the tests.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect, private and public uncertainties associated with a geological asset or information associated therewith are defined, and private uncertainties are assigned a subjective probability representing the best state of knowledge currently available. A multi-dimensional valuation-time lattice is constructed using the subjective probabilities for the private uncertainties and using risk-neutral probabilities for the public uncertainties. A backward recursion through the multi-dimensional lattice is performed in order to generate a present value for the asset given the present information available. During the backward recursion, a tally of delta hedging coefficients is generated and stored in order to provide an operational "map" or "decision pathway" should the project move forward.

In one embodiment, the valuation obtained via the backward recursion is validated through a forward simulation that makes use of delta hedging coefficients that were generated and stored.

According to another aspect, given the present information available as summarized above, the value of new information is computed by generating a present value for the asset, revising the subjective probabilities pertaining to the uncertainty or uncertainties resolved by the new information, constructing a new multi-dimensional lattice, and performing a backward recursion through the new multi-dimensional lattice to generate a new present value for the asset given the updated available information. By subtracting the previously determined present value from the new present value, a value is assigned to the new information.

According to another aspect, the value of an option related to the asset is computed by generating a present value for the asset given the present information available as summarized above without any option, identifying options associated with the asset valuation, and then during the backward recursion, tallying any option exercised in order to arrive at an asset value with option(s). By subtracting the previously generated (present) value from the asset value with option (s), a value is assigned to the option(s).

In one embodiment, the valuation obtained via the backward recursion while tallying the options is validated through forward simulation making use of the delta hedging strategy and options that may have been exercised.

BRIEF DESCRIPTION OF THE DRAWINGS

FIG. 4 is a representation of a public price lattice of the value of carbon tax credits.

FIGS. 5a and 5b are 3D probability maps showing the likelihood of carbon dioxide saturation exceeding 5% within 99 years of the start of a project using present and new information respectively, and FIG. 5c is a key for FIGS. 5a and 5b.

DETAILED DESCRIPTION

This application provides methods for assigning specific values to the exploitation of geological resources and to the exploration of geological resources. With respect to the valuation of the exploitation of geological resources, two embodiments are hereinafter described: the valuation of property overlying a formation in which carbon dioxide may be sequestered, and the valuation of property overlying a formation containing oil. With respect to the valuation of the exploration of a geological resource, one embodiment is hereinafter described: the valuation of new information obtained through the use of a monitoring well for a carbon dioxide sequestration project.

In valuing a geological asset, for purposes of this application, certain terms are useful and should be defined. Thus, the term "public uncertainty" is defined as uncertainties that are purely market-related and external to the asset. For example, the future price of oil is a public uncertainty. Likewise, the price per unit volume of carbon dioxide injected and/or carbon credits can be considered a public uncertainty. In the methods described herein, because they are market-driven, public uncertainties are treated with risk-neutral probabilities.

The term "private uncertainty" is defined as uncertainties that apply strictly to the asset itself and are completely independent of any market-derived uncertainty. Generally, private uncertainties relate to the physical properties of an asset. For example, the amount of oil located in a formation (the "resource") is a private uncertainty as is the cost of producing the oil. Likewise, the rock type, permeability and storage volume of a formation that allows us to estimate "reserves" is a private uncertainty for carbon-dioxide sequestration projects. In the methods described herein, private uncertainties are described with subjective probabilities. Resolution of private uncertainties may be described by discrete lattices or probability maps.

Figure 1:
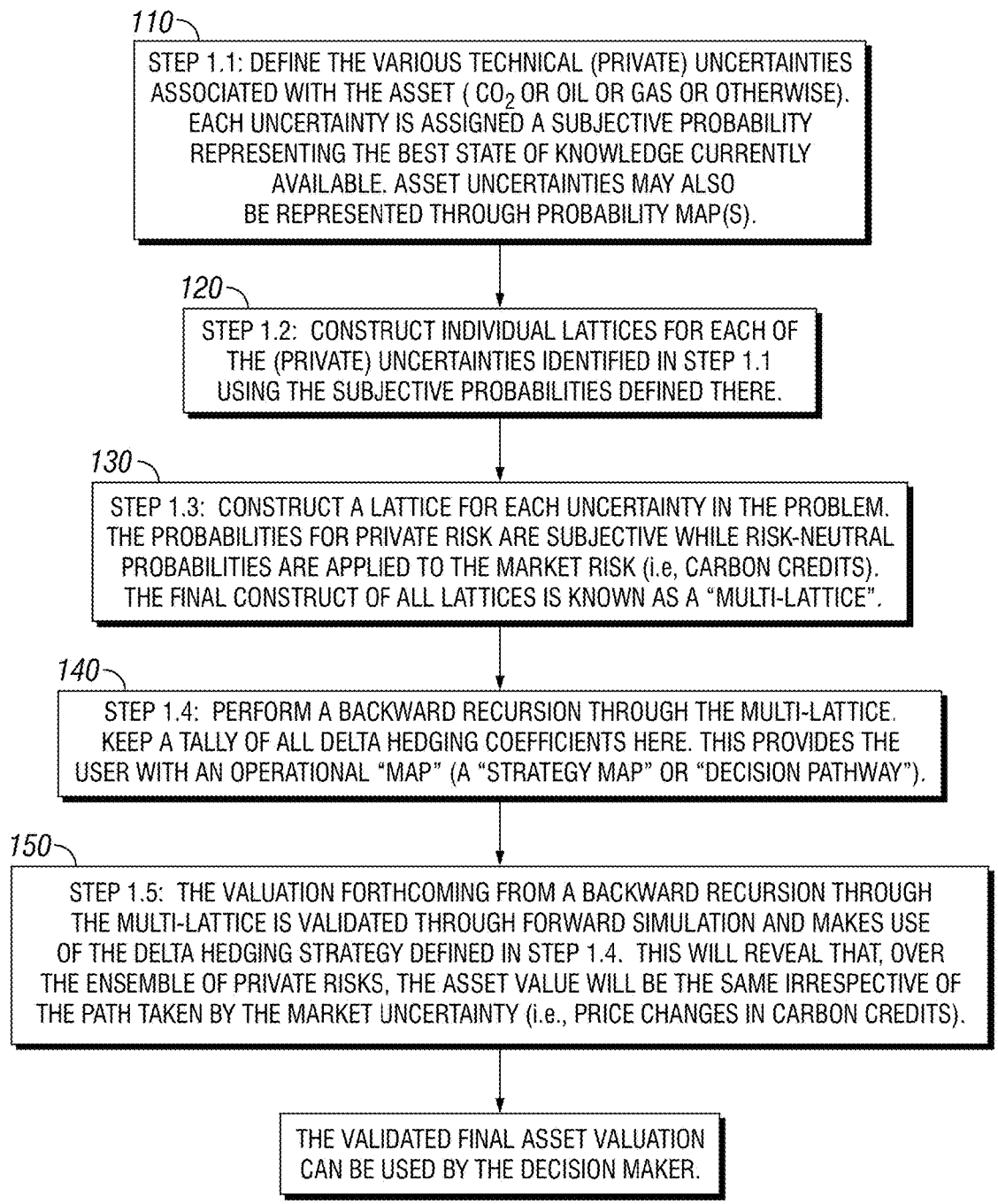
FIG. 1 is a flow chart of a method of generating an asset valuation.

Turning now to FIG. 1, a high-level flow chart of a method of generating an asset valuation for a geological asset is seen. At 110, the various private uncertainties associated with a geological asset such as a formation containing oil or gas, or a formation capable of receiving carbon dioxide for sequestration are defined. Each private uncertainty is assigned a subjective probability representing the best state of knowledge currently available. In one embodiment, the private uncertainties are represented through a probability map. At 120, individual lattices are constructed for each of the private uncertainties identified at step 110 using the subjective probabilities defined there. At 130, lattices are constructed for public uncertainties using risk-neutral probabilities. The combination of the private and public uncertainty lattices is called a "multi-dimensional lattice."

At 140, a backward recursion is performed through the multi-dimensional lattice to provide a net present value (NPV) of the asset. The backward recursion utilizes a hedging strategy that eliminates the effect of public uncertainty. During the backward recursion, a tally is kept of delta hedging coefficients at each node of the multi-dimensional lattice. The delta hedging coefficients provide an operational or strategy map during exploitation of the asset. It should be appreciated that the backward recursion through the multi-lattice associated with a real-world analysis of a geological asset value must be accomplished by high-powered computer equipment or the equivalent thereof (broadly referred to as a "processor"). The processing required is substantial and is not reasonably within the capacity of a human using "pencil and paper."

In one embodiment, the valuation resulting from the backward recursion through the multi-dimensional lattice is validated at step 150 through a forward simulation that makes use of the delta hedging strategy. The validation should show that over the ensemble of private risks, the asset value would be the same regardless of the path taken by the market uncertainty.

Figure 2:
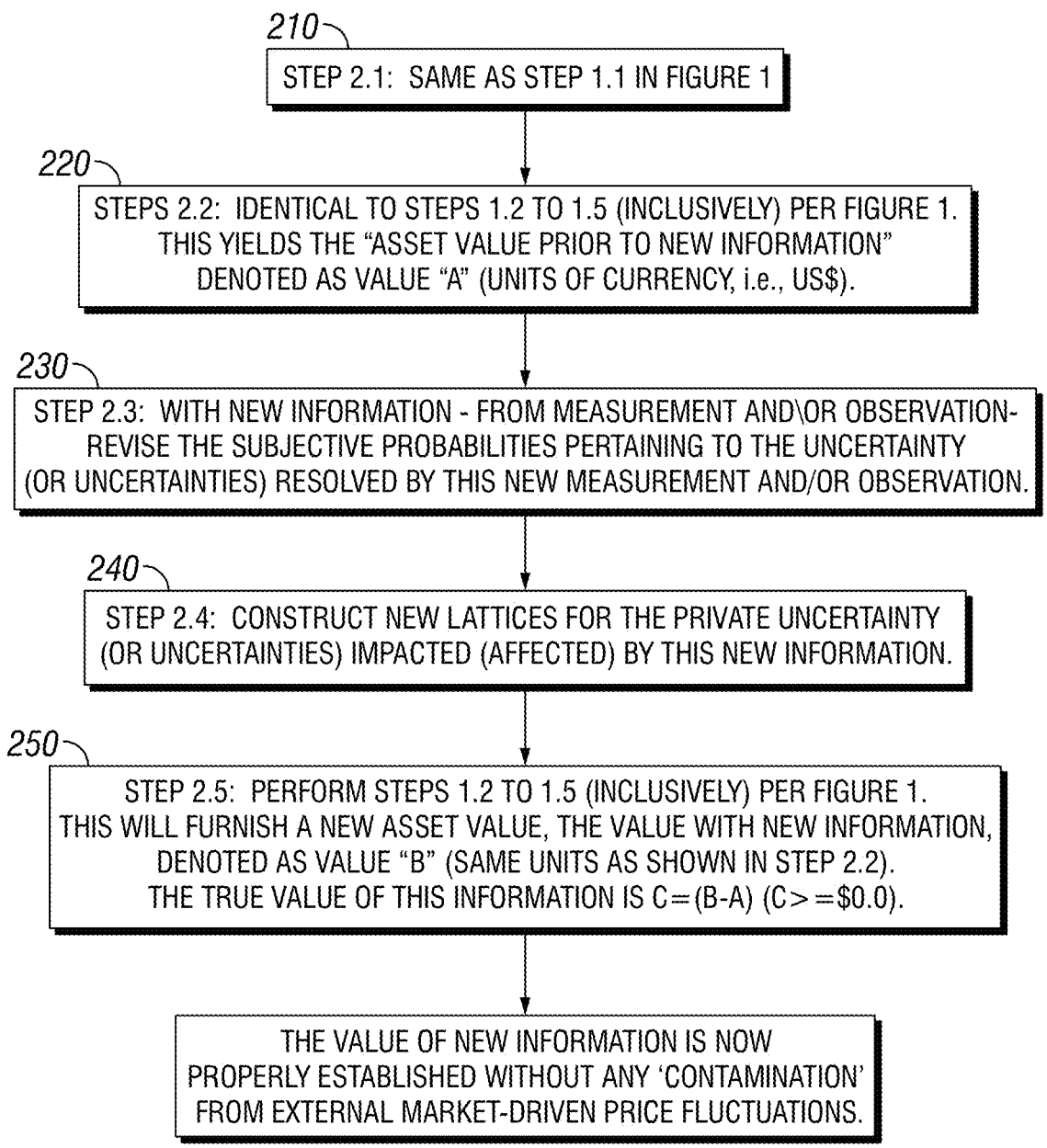
FIG. 2 is a flow chart of a method of valuing new information.

A high-level flow chart for valuation of new information regarding a geological asset is provided in FIG. 2. At steps 210 and 220, the private and public uncertainties associated with the asset are defined, a multi-dimensional lattice is generated, a backward recursion is performed through the multi-lattice while keeping a tally of delta-hedging coefficients and a validation is optionally undertaken using a forward simulation. The value of the asset "A" is stored. Then, based on new information that can be obtained from measurements or observation, the subjective probabilities pertaining to one or more private uncertainties are modified at step 230. Using the new private uncertainty information, new (updated) private uncertainty lattices and a new (updated) multi-dimensional lattice is generated at 240. Then, at step 250 a backward recursion utilizing the hedging strategy that eliminates the effect of public uncertainty is performed through the new multi-lattice to provide a new NPV of the asset. The difference of the resulting value "B" from the previously stored value "A" is the value "C" of the new information. In one embodiment, prior to calculating the value of the new information, the valuation B is validated through a forward simulation.

Figure 3:
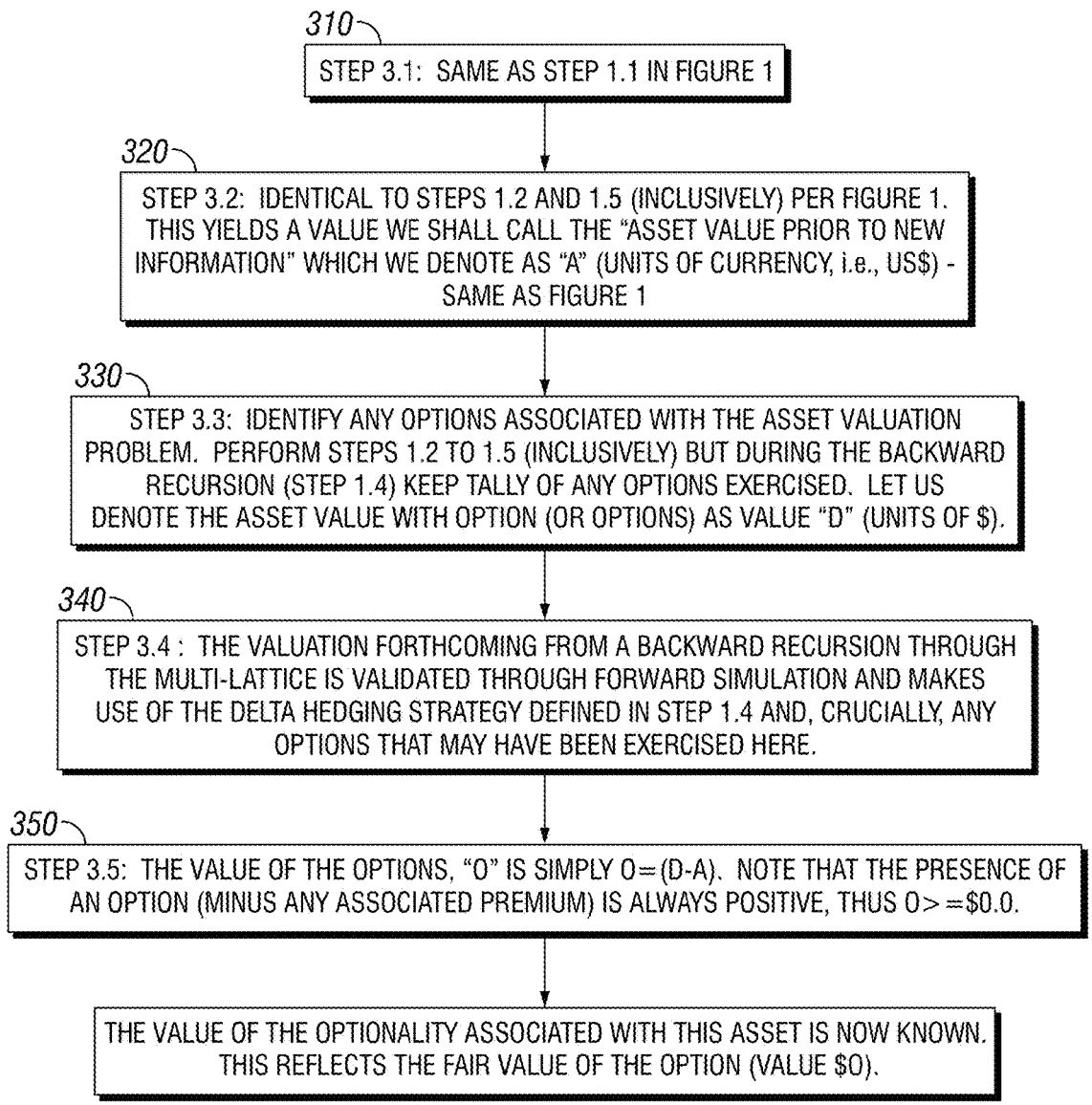
FIG. 3 is a flow chart of a method of valuing options.

According to one aspect, options related to an asset may be considered a subset of new information. A high-level flow chart for valuation of an option related to a geological asset is seen in FIG. 3. At steps 310 and 320, the private and public uncertainties associated with the asset are defined, a multi-dimensional lattice is generated, a backward recursion is performed through the multi-dimensional lattice while keeping a tally of delta-hedging coefficients and a validation is optionally undertaken using a forward simulation. The value of the asset "A" is stored. At step 330, options associated with the asset valuation problem are identified, new (updated) private uncertainty lattices and a new (updated) multi-dimensional lattice that account for the option information are generated, and a backward recursion is run through the new multi-lattice to provide a new NPV of the asset (valuation D). The backward recursion utilizes the hedging strategy that eliminates the effect of public uncertainty, and a tally is kept of both the delta hedging coefficients and the options exercised (if any) at each node. In one embodiment, prior to calculating the value of the options, the calculated valuation D is validated at 340 through a forward simulation that makes use of the delta hedging strategy and the options that are expected to be exercised. Regardless, the difference of the resulting value "D" from the previously stored value "A" is calculated at 350 as the value "O" of the options.

With the high-level flow charts of FIGS. 1-3 as a guide, details regarding the valuation of a carbon dioxide injection/ sequestration project, the valuation of new information pertinent to that project, and the valuation of options associated with that project are now disclosed in further detail. It is assumed that an open marketplace exists for both present and future carbon credits (public uncertainties). It is also assumed that the physical properties of the formation underlying the property being assessed is not fully known, but that the rock type, permeability, storage volumes, pressures, etc. (private uncertainties) can be described with subjective probabilities. It is further assumed that operational flexibility exists; that is, that obtaining additional information will permit the operator to change at least one aspect of the exploitation of the asset. Operational flexibility allows the evaluation of the types of measurements that will provide the most useful and impactful information such as the location of a monitoring well or wells, and the depth or zone in the well where measurements should be taken. For the valuation of the project, the new information, and the options, net present value (NPV) is used as the primary figure-of-merit because penalties for possible violations, lease block purchases and cash flows are easily translated into monetary value.

In providing a suitable valuation of the property of interest it should be appreciated that cash flows need to take into account the impact of any regulatory penalties that can be imposed by authorities if, in any time period, carbon dioxide migrates into a neighboring, independently owned property. Such penalties may prove fatal to the economic viability of a sequestration/injection project, because injection must stop once carbon dioxide has been detected outside the permitted region. Continued injection will impose strong negative cash flows. It should be noted that measurement and identification of such violation could be conducted at any time by either regulatory authorities or the owner of the block that has been encroached into, and the project owner has no input or control over such measurements. Additionally, even if no encroachment is perceived at the time of monitoring, predictions for future migration might entail cessation of injection if this is expected to decrease NPV through future penalties.

According to one embodiment, starting with a lattice for public uncertainties, a multi-dimensional lattice is generated by, providing a private-uncertainty lattices from each node of the public-uncertainty lattice. In one embodiment, this multi-dimensional lattice is effectively collapsed into a two-dimensional "price lattice" by taking at each node of the public uncertainty lattice an average over the private uncertainties, or by substituting "certainty equivalents" as disclosed in Luenberger, T. A. *Investment Science*, (Oxford University Press, UK 1998), or by utilizing a probability map as described below. Cash flows are taken over all branches of the "price lattice." The price lattice approach provides a visual medium to observe period cash flows.

FIG. 4 presents a simple illustration of such a price lattice applicable to the value per unit mass of $CO_2$ avoided (not emitted) or carbon tax credit. In FIG. 4 each node represents a fixed point in time with the left-most root-node representing time $t=0$. From each node, in the simple illustration, two possibilities are presented for the value of the carbon per unit mass avoided at the next point in time. It should be appreciated that more possibilities could be presented at one or more of the nodes.

In one aspect, when calculating cash flows, a hedging strategy is used to eliminate the effect of public uncertainty in the project valuation. The hedging strategy is based on the $\Delta$-hedge ratios that can be computed at each time step (node) using the delta-hedge equation $$(\Delta)_{t-1} = \frac{(NPV_U)_t - (NPV_D)_t}{(S_U)_t - (S_D)_t}, \quad (1)$$

where $S_U$ and $S_D$ are respectively the up and down prices of carbon per unit mass avoided. If the root node of the analysis to defined to be at $t=0$, then the figure-of-merit, F, without new information, will be:

$$F|\emptyset = (NPV|\emptyset)t=0, \quad (2)$$

where 'Ø' stands for 'No New Information.' The figure-of-merit is obtained by performing a backward recursion through the price lattice (i.e., starting at a final time frame and working backwards through the lattice to time $t=0$). According to one aspect, a tally (i.e., a running list) of delta-hedging coefficients is kept during the backward recursion, thereby providing an operational "map" for moving forward with the project.

When no new information is available, probability maps can only be generated using the best available information at the time and are usually generated at $t=0$. Such maps may, for example, furnish the likelihood of exceeding a particular $CO_2$ saturation at a specified spatial location in the future. Given this information, the asset owner may then judge the degree of risk associated with migration of $CO_2$ outside the spatially defined limits. Such risk-tolerance and judgment will then factor into the "no new information" price lattice valuation described above.

FIG. 5(a) provides an example of such 3D probability map ("without new information") showing the likelihood of $CO_2$ saturation exceeding 5% after 99 years since the start of the project where the vertical injection well is shown at approximately (x,y) coordinate (6800,7700). The intensity bar scale (FIG. 5c) indicates that the likelihood of the carbon dioxide saturation exceeding 5% after 99 years is highest in areas offset from the injection well, although the likelihood of the same in areas far removed from the injection well are very low. The probability map is incorporated into the price lattice by permitting the private uncertainty lattice to be collapsed at each node of the price lattice into a single number based on a statistical model.

New information may be obtained either from a measurement at a monitoring well (which may or may not have already been drilled), from existing logs or other sources. In one embodiment, this new information (from whatever source) should have two intrinsic effects: reducing existing uncertainty; and resulting in some operational change in the $CO_2$ injection (such as reduced injection rate, zonal isolation of a hitherto unknown high permeability layer, etc.). This information will also allow the updating and reconstruction or revision of the probability maps previously mentioned.

With new information, construction of new private uncertainty lattices is enabled, either directly with revised subjective probabilities or derived from the probability maps. The timing of this new information should be within the window of the analysis period being considered. While in some cases full and unambiguous resolution of uncertainties can be defined, other situations may be encountered where such thorough and complete resolution is not apparent. Under such circumstances, the cash flows computed in the backward recursion should be expectations (or quantiles) that consider all residual uncertainties at that time. The hedging strategy will require computation of the Δ-hedge ratio at each node during the backward recursion. It will be appreciated that if no new information is forthcoming, then no new multi-dimensional lattice is needed.

The backward recursion through the multi-dimensional lattice furnishes a valuation that can be shown to be the same as the average value over all private uncertainty realizations irrespective of the price path of the public uncertainty so long as the Δ-hedging strategy is implemented. Volatility associated with carbon credits or revenue streams that are subject to an open and free market are eliminated from the valuation of the $CO_2$ storage project. Thus, the uncertainty in the resulting value of the asset will depend solely upon the private uncertainties associated with the project.

Defining the root node of the analysis to be t=0, the final single-valued figure of merit calculated by the backward recursion will be (NPV|With New Information)$_{t=0}$. Consequently, the value of the new information, $V_i$, is found according to $$V_i = (NPV|\varnothing)_{t=0} - (NPV|\varnothing)_{t=0}, \quad (3)$$

where '⊕' stands for 'With New Information'. According to one embodiment, it is this basic valuation expression that should be maximized when attempting to identify a best monitoring well location, measurement type and zone that will provide the new information.

Figure 6:
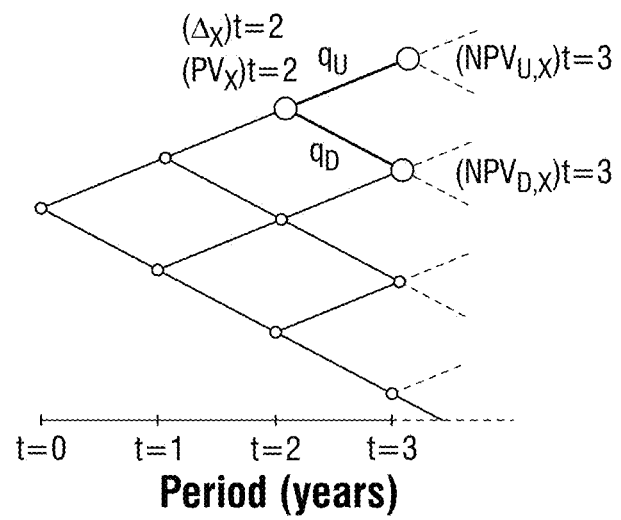
FIG. 6 is a representation of a price lattice with up and down probabilities indicated.

When the new information is available (e.g., from the measurements in the monitoring well), one can construct the multi-dimensional lattice for the purposes of asset valuation. A sample of such a lattice, using NPV as the figure of merit, is shown in FIG. 6 (although this figure shows only the "price lattice" since it is not easy to properly draw the extra dimensions added by including each private uncertainty lattice). In FIG. 6 a typical backward recursion solution is shown between two arbitrary points in time $t_3 \rightarrow t_2$. For demonstration purposes, both up (U) and down (D) values of NPV (at t=3) are shown for some private uncertainties, which for illustration only, are denoted as x, i.e., $(NPV_{U,x})_{t=3}$ and $(NPV_{D,x})_{t=3}$, respectively. The backward recursion through the multi-lattice includes an additional computation of the Δ-hedging coefficient at each node. The general formulation for present value (PV) at any particular node (without basic optionality) is given by $$(PV)_{t-1} = \frac{\sum_i \sum_w q_i p_w (NPV_{i,w})_t}{1+d_{rf}} = \frac{\sum_i q_i (NPV_i)_t}{1+d_{rf}}, \quad (4)$$

where $$(NPV_i)_t = \sum_w p_w (NPV_{i,w})_t. \quad (5)$$

The probabilities $q_i$ represent t risk-neutral probabilities and the index i∈{U, D} relates to market (public) risks where 'U' is the up state and 'D' is the down state. The probabilities $p_w$ represent subjective probabilities, the subscript w represents the different private uncertainty states {j, k, . . . , n} and $d_{rf}$ is the risk-free rate (per annum). At each time t, the net present value (NPV)$_t$ is related to the present value (PV)$_t$ by $$(NPV)_t = (PV)_t + (c_f)_t, \quad (6)$$

where $c_f$ is cash flow.

The operator may cease injection at any time, i.e., when $CO_2$ encroachment into a neighboring block is certain. This represents a simple operational option and can be incorporated into equation (4):

$$(PV)_{t-1} = \max\left(\frac{\sum_i \sum_w q_i p_w (NPV_{i,w})_t}{1+d_{rf}}, \text{cease injecting}\right). \quad (7)$$

With these basic sets of equations, the multi-lattice can be traversed to define the figure-of-merit (i.e., NPV) associated with the acquisition of the new information and possible associated operational changes.

Another aspect involves the use of a forward simulation to effectively validate the results of the backward recursion through the multi-dimensional lattice. A forward simulation demonstrates that the valuations forthcoming from the backward recursion (with and without new information) have real and tangible operational meaning since the Δ-hedging strategy and any option-related strategies can be realistically implemented; i.e., the backward recursion with the delta hedging coefficient tally provides an "asset management route" (a recipe for future operational decisions and actions).

When new information is obtained about reservoir performance, probability maps may be revised (updated) to take into account any subsequent operational actions that may be necessary (for example, injection into high permeability layer may be shut off, or the total injection rate or start water injection in a certain part of the reservoir may be reduced to prevent $CO_2$ encroachment, the injected $CO_2$ may be produced to prevent encroachment, etc.) FIG. 5(b) shows a 3D probability map for the likelihood of $CO_2$ saturation exceeding 5% after 99 years since the start of the project for the same formation as described above with reference to FIG. 5a, but revised and updated after taking into consideration new information obtained from the monitoring well shown at x,y coordinate (7000,9000). While not ready visible, for any spatial location, FIG. 5(b) has slightly different probabilities than those shown in FIG. 5(a) for the same location (and time). These revised probability maps may then be used to construct the private lattices for the given private uncertainty for which the map was created and to extract the subjective probabilities in time. It should be appreciated that while 3D probability maps are described as an example of how subjective probabilities for private uncertainties may be defined, 2D probability maps or other methods for defining the subjective probabilities of all private uncertainties present in the system may be utilized.

A number of practical applications may be specified from results of this analysis. For example, single, deterministic valuations may be made (for example, where the measurement type and monitoring well location are already known), or the analysis may be used to optimize the type of information and/or the location of any monitoring well whose location has not yet been defined. The latter (optimization) aspect of the valuation necessitates multiple applications of the analysis.

More particularly, the value V of information provided by individual measurements $M \in \{m_1, \ldots, m_n\}$, made to track $CO_2$ plume evolution in time can be calculated assuming that a monitoring well or associated logs are available. This is obtained from:

$$V=(NPV|\oplus,M)_{t=0}-(NPV|\varnothing)_{t=0}. \quad (8)$$

This approach can be used to identify an optimum measurement, i.e., the measurement yielding the maximum value of information (and/or rank of values) according to:

$$V=\max_M(NPV|\oplus,M)_{t=0}-(NPV|\varnothing)_{t=0}, \quad (9)$$

where $M \in \{m_1, \ldots, m_n\}$. By maximizing the expression above over the certain time period, the optimum time can be found for the measurement M to be performed in order to provide maximum value of information.

Similarly, the value of information provided by measurements M at a given monitoring well location (x, y) is given by:

$$V=(NPV|\oplus,M(x,y))_{t=0}-(NPV|\varnothing)_{t=0}, \quad (10)$$

where $M(x, y)$ represents a specific measurement "M at Well Location (x, y)." This approach can be used to identify the optimum well-location (and/or rank of locations) for monitoring by conducting an exhaustive evaluation for all monitoring well locations (over the (x, y) area of interest and finding the specific measurements $M(x, y)$ that maximizes the corresponding value of information according to:

$$V=\max_{M(x,y)}(NPV|\oplus,M(x,y))_{t=0}-(NPV|\varnothing)_{t=0}. \quad (11)$$

Here, $M(x, y)$ is a specific measurement (or is a set of measurements) taken at monitoring well location (x, y). The corresponding NPV will include the cost of drilling the well, which in general will depend on the (x, y) location.

The analysis may be focused even more specifically on the vertical region or a number of station measurements within the monitoring well itself, defined as $z \in \{z_1, z_2, \ldots, z_n\}$, by being able to value the information of measurement(s) R as a function of location, z, within the well according to $$V=(NPV|\varnothing,R(z))_{t=0}-(NPV|\varnothing)_{t=0}, \quad (12)$$

where R(z) stands for "R obtained over zone z." This approach can be used to identify the optimum zone within the monitoring well (i.e., the zone in the monitoring well where maximum value is obtained by taking measurements) as follows:

$$V=\max_{R(z)}(NPV|\oplus,R(z))_{t=0}-(NPV|\varnothing)_{t=0} \quad (13)$$

in both equations (12) and (13), R(z) is either a specific measurement or set of measurements such that $R \in \{m_1, \ldots, m_n|z\}$.

Given the above possibilities, it will be appreciated that an analysis involving one, some (a combination), or all of the above analyses can be accomplished. Moreover, these analyses in parts or in whole may be combined with an introduction of sequence times $t_s$ that relate to the timing of the measurements which may also be subject to optimal valuation. For example, considering all of the approaches described above with measurement M or R as a function of not only aerial location (x, y) but also at depth location z and at possible sequence time(s) $t_s$, the following is obtained $$V=(NPV|\oplus,U(x,y,z),t_s)_{t=0}-(NPV|\varnothing)_{t=0}, \quad (14)$$

where U(x, y, z) stands for "measurement(s) at Well Location (x, y) obtained over zone z." This approach can be used to identify the optimum measurement S, monitoring well location (x, y), zone z, and at possible sequence time(s) $t_s$ as follows:

$$V=\max_{s(x,y,z),t_s}(NPV|\oplus,U(x,y,z),t_s)_{t=0}-(NPV|\varnothing)_{t=0} \quad (15)$$

Figure 7A:
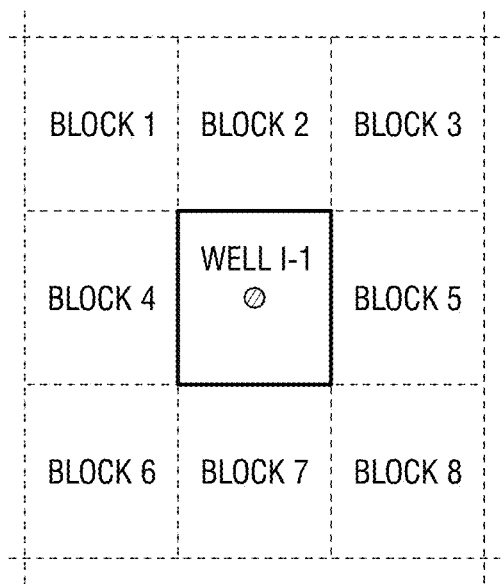
FIGS. 7a and 7b are aerial representations of a carbon dioxide injection project at inception and completion of the project.
Figure 7B:
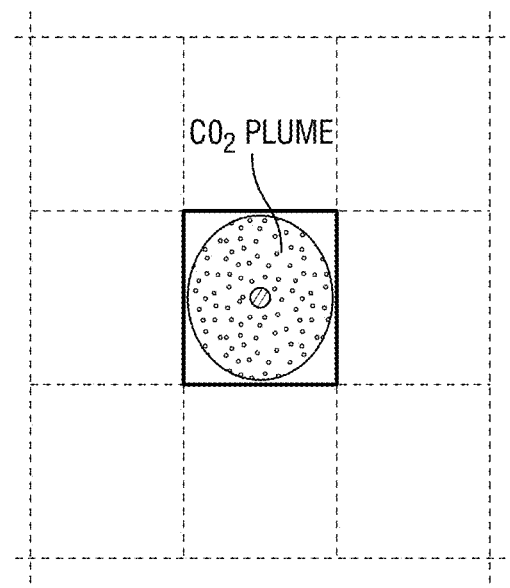

The previously described valuation procedure can be applied to the valuation of lease options. FIG. 7(a) shows the general lease-block structure of a project with $CO_2$ injection well, Well I-1, located in the center of an indicated asset block. All surrounding blocks are owned by other asset-holders. FIG. 7(b) shows an idealized aerial representation of the $CO_2$ plume at the end of the project life, t=T with the $CO_2$ plume remaining within the asset block without encroachment into any neighboring property.

It will be appreciated that within the scope of expected regulations, injected $CO_2$, must not encroach into neighboring properties. Injection must also cease at the point of realization of any such encroachment into such properties, negating the economic viability of the project. It may also be assumed that the owner of Well I-1 cannot simply purchase some, or all, of the neighboring properties outright at project inception in anticipation of possible encroachment as this will make the initial capital expenditure too high and adversely affect the economics of the project (it may never be profitable). Consequently, one viable course of action is to enter into some pre-defined 'right-to-buy' agreement with the neighboring property owners. This will take the form of an option where, for an up-front fee to these block owners, the owner of Well I-1 will have the right, but not the obligation, to purchase that property from its owner for some pre-agreed sum of money at particular times during the life of the project. In other words, at particular points in time during the lifetime of the $CO_2$ injection/sequestration project, the owner of Well I-1 may choose to invoke the right to purchase one (or more) neighboring properties if it is concluded that there is a possibility of $CO_2$ encroachment and, therefore, possible imposition of regulatory penalty. The right to purchase may also be limited to subsurface injection rights.

In one embodiment, probability maps are used to provide a technical mechanism to quantify likelihood of potential $CO_2$ incursion. Measurements performed at the monitoring wells and other geophysical logging (including time-lapse seismic and electromagnetic surveys) can be used to track $CO_2$ plume evolution (thus providing data to update the probability map) and establish the probability of $CO_2$ encroachment should it occur.

Figure 8B:
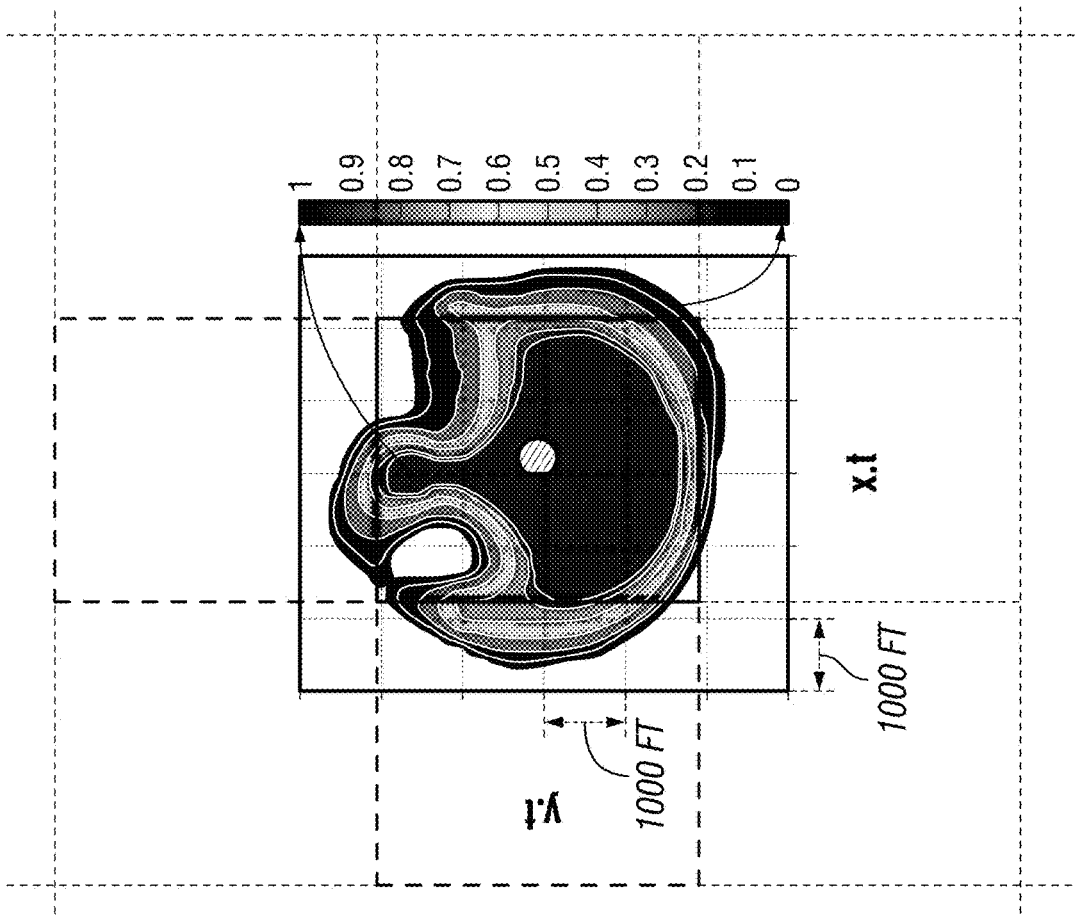
FIG. 8b is a probability map of carbon dioxide saturation at a specific time.
Figure 8A:
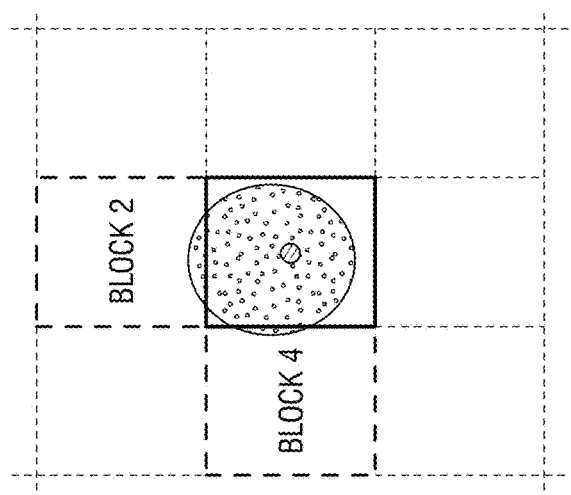
FIG. 8a is an aerial view showing carbon dioxide plume encroachment into neighboring properties.

FIG. 8a illustrates the same aerial view of the asset first shown in FIG. 7a, but represented as a plot of the $CO_2$ plume (at, say, time t=7) encroaching into neighboring properties #2 and #4, thereby incurring penalties. FIG. 8b shows the same blocks, but this time with an example of a $CO_2$ saturation probability map superimposed. The over-lay of such a probability map allows the construction of the private uncertainty lattices and thereby establishes realistic prices for any 'right-to-buy' option for any of the neighboring grid blocks. In one embodiment, the lattice can be constructed to represent probability of $CO_2$ plume reaching a specific block by taking the maximum value of the probability map within a given block.

The probability map of FIG. 8b indicates the strong likelihood probability (>80%) of encroachment into neighboring property blocks #2 and #4. However, it also shows a strong likelihood (about 70%) of encroachment into neighboring property #5 as well as a small likelihood (about 30%) of encroachment in neighboring property #7. The risk tolerance of the decision maker is then used to determine whether to exercise the option or not.

The general expression for present value with optionality and new information is as follows:

$$(PV)_{t-1} = \max\left(\frac{\sum_i \sum_w q_i p_w (NPV_{i,w})_t}{1 + d_{rf}}, \text{option value } n\right) = \quad (16)$$

$$\max\left(\frac{\sum_i q_i (NPV_i)_t}{1 + d_{rf}}, \text{option value } n\right)$$

where the 'option value' refers to a specific neighboring lease block, n. The $NPV_i$ stated in equation (16) is given by equation (5). At each time t, the net present value $(NPV)_t$ is related to the present value $(PV)_t$ by equation (6).

Forward simulation may be utilized to validate the valuation obtained from this analysis. In forward simulation, the $\Delta$-hedge ratio of equation (1) found for each node is utilized. Regardless of where one is located in the decision tree (the multi-dimensional lattice), if the node in question indicates that an option should be exercised, then it should be exercised. If not, the $\Delta$ forward contracts of carbon credits obtained via the $\Delta$-hedge ratio of equation (1) for that node should be shorted. It is assumed that the contract is settled at the beginning of the next period. The settlement cash flow (SCF) at time t is given by:

$$(SCF)_t = -\Delta_{t-1}[S_t - (1+d_{rf})S_{t-1}] \quad (17)$$

where S is the spot price of the carbon credit. In the forward simulation, each realization of the private uncertainty is simulated separately, but the decision and hedging strategies use only the current state of information. Cash flows are accumulated and it is assumed that the cash on hand earns the risk-free rate (even when negative).

It should be appreciated that while an embodiment regarding the valuation of a carbon-dioxide injection/sequestration project, including the value of the project, the value of new information associated with the project, and the value of options to land blocks adjacent the project have been described, the same valuation procedures may be used in conjunction with the exploitation of other geological assets where private and public uncertainties exist. For example, oil fields may be valued using the same procedures.

Figure 9:
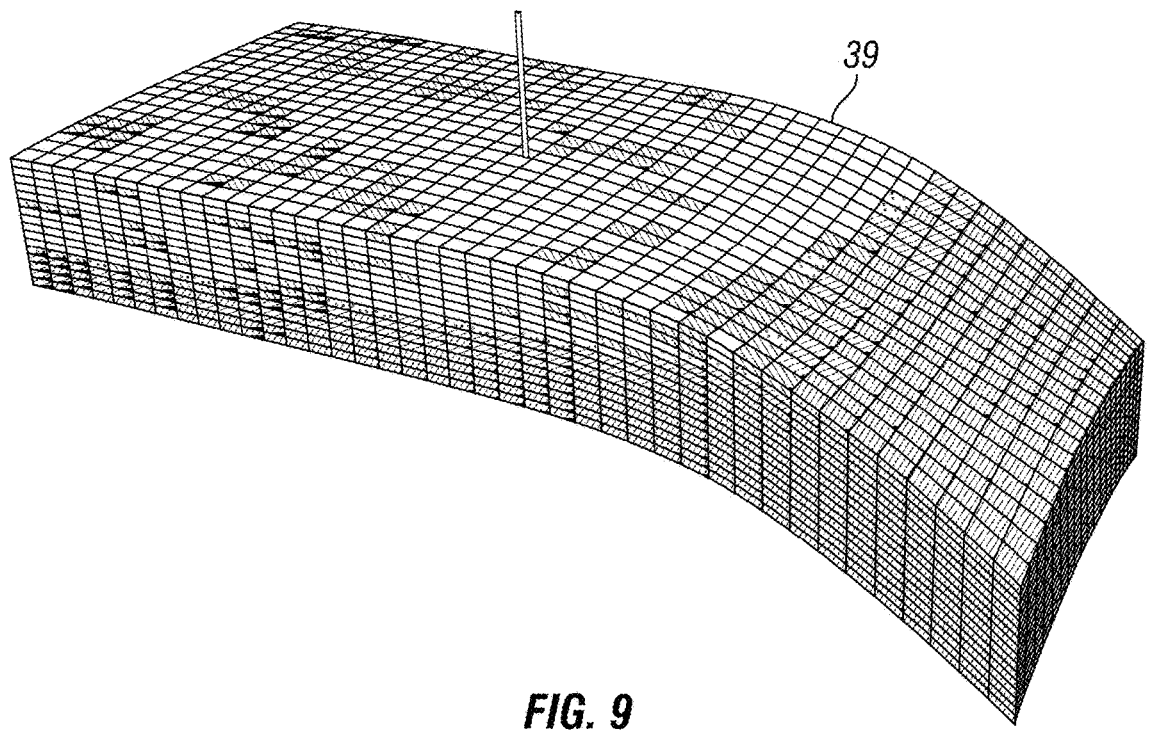
FIG. 9 is a perspective view of an oilfield asset simulation grid.

FIG. 9 shows a view of a simulation grid representing a small compartmentalized oil field. The reservoir is bounded on three sides by impermeable boundaries with an aquifer on its eastern flank (right side of the figure). The asset is exploited by a single production well (shown in FIG. 9 as a vertical line) tied-back though a subsea line to a processing facility situated a few kilometers away. The maximum flowing liquid capacity of the well is stated to be 12,500 barrels of liquid per day (denoted by $Q_{liq}$). While $Q_{liq}$ will remain constant throughout the 7-year span of the analysis, the proportion of oil and water contributing to this total flow is assumed to vary following the simple relationship $Q_{liq} = Q_{oil} + Q_{wat}$. All flowrates and valuations are to be taken at the end of each period.

With the oil field of FIG. 9, the following independent private (reservoir-related) uncertainties exist: the initial oil fraction, $f_{init}$ and the decline rate, $\beta$. The initial oil fraction is assumed to be 100%. It is further assumed that this uncertainty is fully and unambiguously resolved at t=1 through observation. After this time, the fraction of oil declines at a rate governed by the second private uncertain parameter $\beta$ (decline rate). The extent of pressure support in the reservoir dictates how fast oil production will decline in time. There is no indication as to this value during period t=0→1 as there is no decline present (production remains flat). However, during period t=1→2, oil production will begin to decline at an annual percentage rate given by $\beta$. This, in turn, is fully and unambiguously resolved at t=2 through observation between t=1→2. It is assumed that three equi-probable states exist for $\beta$, namely, "gentle" or 'G' ($\beta_G$=10%), "intermediate" or 'I' ($\beta_I$=17.5%) and "aggressive" or 'A' ($\beta_A$=25%). The fraction of oil produced is described by the following relationship:

$$f_{oil}(t) = \frac{f_{init}}{(1+\beta)^{t-1}} \quad (18)$$

Figure 10:
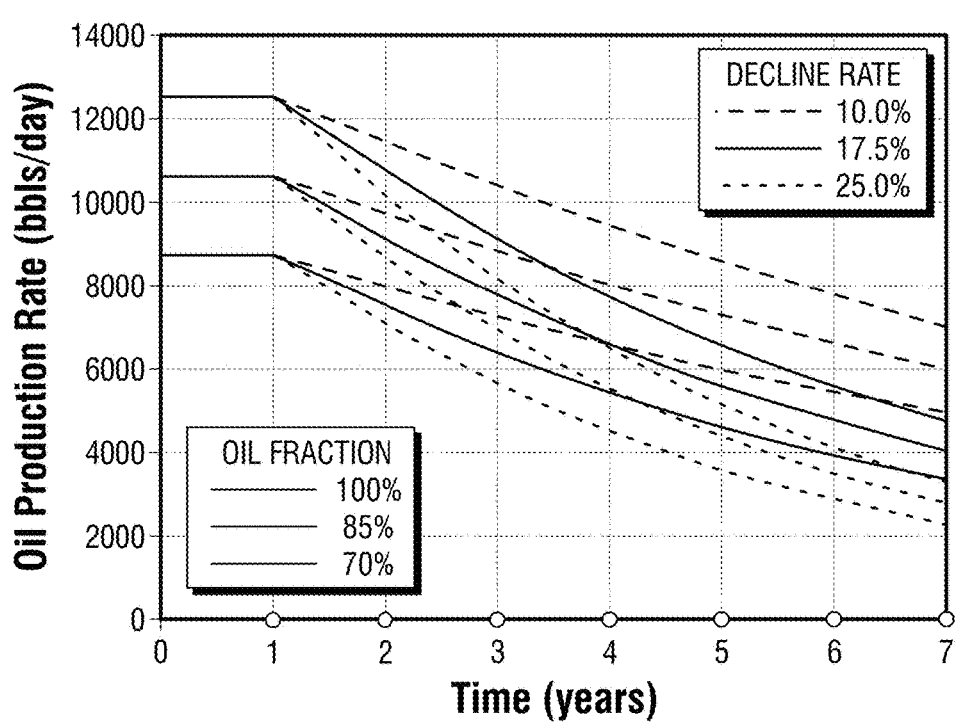
FIG. 10 shows plots of the variation in oil production as a function of two private uncertainty parameters.

As only oil and water are produced from the well, oil production $Q_{oil}$ is defined as $Q_{liq} f_{oil}$. FIG. 10 shows plots of the variation in oil production as a function of these two parameters. The probabilities assigned to each of these private uncertainties represent the best state of knowledge by the asset holder at the time. For simplicity, the instantaneous flow rates obtained at the end of the period are used.

It is noted that the nature of the recursion used in this valuation assumes independent i.e., sequential, resolution of the physical uncertainties. However, if these two uncertainties were resolved simultaneously, the subsequent recursion would be different.

In this embodiment, the public (market) uncertainty is the oil price, S. Unlike the private uncertainty, the oil price model is not subjective, but is chosen to agree with the available market date on oil futures and options. For purposes of this example, it is assumed that the initial value is $50/bbl and it is assumed, for simplicity only, that the market data is consistent with a risk neutral price model with an annual upward drift, $\mu$, of 3% and an annual volatility, $\sigma$, of 20%. In addition, a risk-free rate of $d_{rf}$=4.25% per annum is assumed.

Variable and fixed daily operating expenses are assumed as follows. The cost, LC of lifting the liquid (water and oil) to surface is set at $5.00 per barrel (of liquid). The cost, PC, of processing the produced liquid is $2.25 per barrel (of water). The cost, TC, of transporting the oil to market via a pipeline is $1.25 per barrel (of oil). The daily fixed costs, FC, are $45,000 per day.

The annual cash flow (CF) at each time period t is given in terms of the spot oil price, S, and oil fraction, $f_{oil}$, by:

$$CF(S, f_{oil}) = 365(R - \alpha - FC) \quad (19)$$

where gross daily revenue, $R = (Q_{liq} \cdot f_{oil} \cdot S) = (Q_{oil} \cdot S)$ with a daily rate-dependent cost, $\alpha$ being given by $$\alpha = (Q_{oil} \cdot TC) + (Q_{wat} \cdot PC) + (Q_{liq} \cdot LC) \quad (20)$$

Table 1 presents oil production and rate-dependent costs, per equation (20), for the nine permutations of private uncertainty present. If S is known, then CF at any period t can be computed according to equation 19. All values in Table 1 relate to the end of the time period stated.

TABLE 1

Upper part: Oil production ($Q_{oil}$) as a function of decline, β, and initial oil fraction, $f_{init}$. Water production at any time is given by $Q_{wat} = 12,500 - Q_{oil}$. Lower part: value of the rate-dependent cost parameter a as stated in equation (20) with units of US $ per day.

| | Gentle Decline Rate $β_G = 10\%$ p.a. Initial Oil Fraction, $f_{init}$ | | | Intermediate Decline Rate $β_I = 17.5\%$ p.a. Initial Oil Fraction, $f_{init}$ | | | Aggressive Decline Rate $β_A = 25\%$ p.a. Initial Oil Fraction, $f_{init}$ | | |
|---|---|---|---|---|---|---|---|---|---|
| Period, t Year | High 100% | Medium 85% | Low 70% | High 100% | Medium 85% | Low 70% | High 100% | Medium 85% | Low 70% |
| Oil Production $Q_{oil}$, in barrels of oil per day | | | | | | | | | |
| 0→1 | 12,500 | 10,625 | 8,750 | 12,500 | 10,625 | 8,750 | 12,500 | 10,625 | 8,750 |
| 1→2 | 11,364 | 9,659 | 7,955 | 10,638 | 9,043 | 7,447 | 10,000 | 8,500 | 7,000 |
| 2→3 | 10,331 | 8,781 | 7,231 | 9,054 | 7,696 | 6,338 | 8,000 | 6,800 | 5,600 |
| 3→4 | 9,391 | 7,983 | 6,574 | 7,705 | 6,550 | 5,394 | 6,400 | 5,440 | 4,480 |
| 4→5 | 8,538 | 7,257 | 5,976 | 6,558 | 5,574 | 4,590 | 5,120 | 4,352 | 3,584 |
| 5→6 | 7,762 | 6,597 | 5,433 | 5,581 | 4,744 | 3,907 | 4,096 | 3,482 | 2,867 |
| 6→7 | 7,056 | 5,998 | 4,939 | 4,750 | 4,037 | 3,325 | 3,277 | 2,785 | 2,294 |
| Value of rate-dependent cost parameter a shown in Eq. (20) in US $ per day | | | | | | | | | |
| 0→1 | 78,125 | 80,000 | 81,875 | 78,125 | 80,000 | 81,875 | 78,125 | 80,000 | 81,875 |
| 1→2 | 79,261 | 80,966 | 82,670 | 79,987 | 81,582 | 83,178 | 80,625 | 82,125 | 83,625 |
| 2→3 | 80,294 | 81,844 | 83,394 | 81,571 | 82,929 | 84,287 | 82,625 | 83,825 | 85,025 |
| 3→4 | 81,234 | 82,642 | 84,051 | 82,920 | 84,075 | 85,231 | 84,225 | 85,185 | 86,145 |
| 4→5 | 82,087 | 83,368 | 84,649 | 84,067 | 85,051 | 86,035 | 85,505 | 86,273 | 87,041 |
| 5→6 | 82,863 | 84,028 | 85,192 | 85,044 | 85,881 | 86,718 | 86,529 | 87,143 | 87,758 |
| 6→7 | 83,569 | 84,627 | 85,686 | 85,875 | 86,588 | 87,300 | 87,348 | 87,840 | 88,331 |

With respect to a salvage option, a multi-period salvage option is defined as follows: Company B, in exchange for an up-front premium, will be obliged to purchase the asset from Company A for an amount agreed by the schedule shown in Table 2. The option may be exercised only at the end of the periods specified.

TABLE 2

Salvage schedule terms used for option valuation. Salvage value a t = 6 and t = 7 is US$0.

| Period, t (years) | Salvage Value at the End of the Period t |
|---|---|
| 1 | US$300.00 × $10^6$ |
| 2 | US$240.00 × $10^6$ |
| 3 | US$192.00 × $10^6$ |
| 4 | US$153.60 × $10^6$ |
| 5 | US$122.88 × $10^6$ |

The example is presented in three sub-sections: oil price, backward recursion and forward simulation.

As suggested above, a risk-neutral process is assumed for the oil price S(t) using a geometric Brownian motion form $$\frac{dS}{S} = vdt + \sigma dz \quad (21)$$

where σ is the volatility and dz is a Wiener process. To obtain the interpretation of v, it is noted that equation 21 is equivalent to $$d\ln S = \left(v - \frac{\sigma^2}{2}\right)dt + \sigma dz \quad (22)$$

The time t forward price, which is the risk-neutral expected price, is given by $$F(t) = E(S(t)) = e^{vt}S(0) \quad (23)$$

so that v is the (continuous) drift in the forward price.

In order to construct a binomial lattice representation of this process, the up and down oil price states are denoted by $(S_U)_{t-1}$ and $(S_D)_t = dx\,(S)_{t-1}$, respectively, where $u = \exp(v\Delta t + \sigma\sqrt{\Delta t})$ and $d = \exp(v\Delta t - \sigma\sqrt{\Delta t})$. The risk neutral probabilities are chosen so that the forward price relationship in equation 23 is satisfied exactly on the lattice for any values of v and Δt. This gives $$q_U = \frac{e^{v\Delta t} - d}{u - d} = \frac{1 - e^{-\sigma\sqrt{\Delta t}}}{e^{\sigma\sqrt{\Delta t}} - e^{-\sigma\sqrt{\Delta t}}} = \frac{1}{e^{\sigma\sqrt{\Delta t}} + 1} \quad (24a)$$

$$q_D = 1 - q_U \quad (24b)$$

Note that $0 < q_U \leq 0.5$ and that $q_U = q_D = 0.5$ in the limit as $\sigma\sqrt{\Delta t} \to 0$. Using these risk-neutral probabilities, the following is obtained:

$$E(\ln(S)) = v\Delta t - \sigma\sqrt{\Delta t}\tanh\left(\frac{\sigma\sqrt{\Delta t}}{2}\right) \approx \left(v - \frac{\sigma^2}{2}\right)\Delta t + O[(\sigma^2\Delta t)^2] \quad (25)$$

$$\text{var}(\ln(S)) = \sigma^2 \Delta t\,\text{sech}^2\left(\frac{\sigma\sqrt{\Delta h}}{2}\right) \approx \sigma^2\Delta t + O[(\sigma^2\Delta t)^2] \quad (26)$$

which shows that the binomial lattice approximation is accurate in the limit $\sigma\sqrt{\Delta t} \to 0$.

If Δt is chosen equal to one year and (1+μ) is defined as exp(v), then with μ=3% and σ=20%, the up and down price movement probabilities are $q_U$=0.45017, and $q_D$=0.54983 respectively. The resultant oil prices are shown in Table 3.

TABLE 3

Combining lattice of oil prices with σ = 20% and μ = 3% (both per annum).
Oil Price, S, in US $ per bbl

| t = 0 | t = 1 | t = 2 | t = 3 | t = 4 | t = 5 | t = 6 | t = 7 |
|---|---|---|---|---|---|---|---|
| | | | | | | | 249.37 |
| | | | | | | 198.22 | |
| | | | | | 157.56 | | 167.16 |
| | | | | 125.24 | | 132.87 | |
| | | | 99.55 | | 105.62 | | 112.05 |
| | | 79.13 | | 83.95 | | 89.07 | |
| | 69.20 | | 66.73 | | 70.80 | | 75.11 |
| 50.00 | | 53.05 | | 56.27 | | 59.70 | |
| | 42.16 | | 44.73 | | 47.46 | | 50.35 |
| | | 35.56 | | 37.72 | | 40.02 | |
| | | | 29.99 | | 31.81 | | 33.75 |
| | | | | 25.29 | | 26.83 | |
| | | | | | 21.32 | | 22.62 |
| | | | | | | 17.98 | |
| | | | | | | | 15.16 |

Figure 11A:
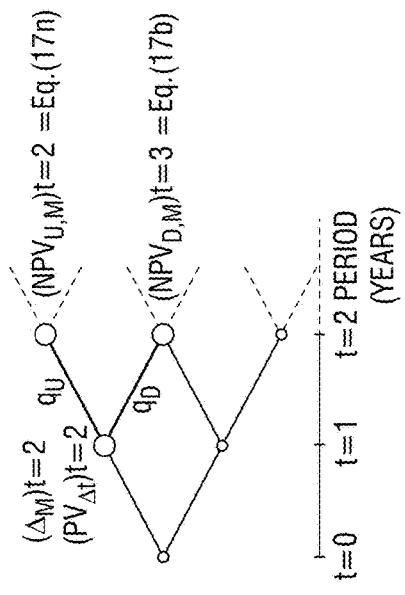
FIGS. 11a-11c are an illustration of the last 3 steps of a backwards recursion process.
Figure 11B:
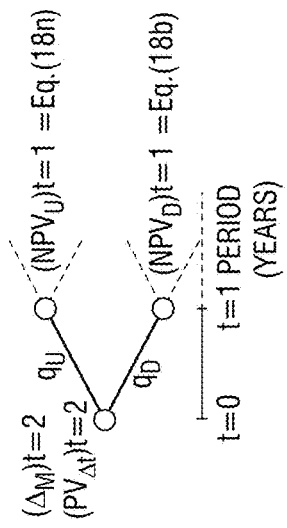
Figure 11C:
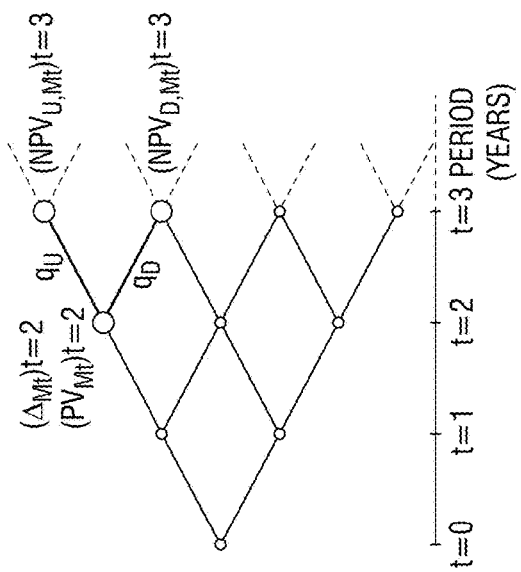

Backward recursion is conducted on the multi-lattice from t=7→0. The key feature is to pay careful attention to the state of resolution of the private uncertainties. FIG. 11(a)-(c) illustrates the process for the last 3 steps in the recursion, essentially visualizing the following equations 27-29.

Where t≥2, all private uncertainty is resolved. More particularly, since all private uncertainty has been resolved by this time, the backward recursion is performed separately for $f_{init}$ and β (denoted by indices j and k respectively). FIG. 11(a) shows one such recursion (for t=2) with PV computed as a function of oil price only. The hedging coefficient Δ at each node is computed using equation (1) (here ($S_U$) and ($S_D$) are the up and down prices for oil). The recursion for t≥2 is given by:

$$(PV_{jk})_{t=2} = \max\left(\frac{q_U(NPV_{U,jk})_{t=3} + q_D(NPV_{D,jk})_{t=3}}{1 + d_{rf}}, \text{option value}\right) \quad (27a)$$

$$(\Delta_{jk})_{t=2} = \frac{(NPV_{U,jk})_{t=3} - (NPV_{D,jk})_{t=3}}{S_U - S_D} \quad (27b)$$

At t=1, one private uncertainty is resolved and one is unresolved. More particularly, in this step, while the initial oil fraction, $f_{init}$, has been resolved at t=1, the production decline β is unresolved at t=1, but resolved at t=2. FIG. 11(b) shows this step of the backward recursion for a given value of j of the initial oil fraction $f_{init}$. The recursion is given by $$(NPV_U)_{t=2} = \sum_{k \in \{G,I,A\}} (p_k) \times (NPV_{U,jk})_{t=2} \quad (28a)$$

$$(NPV_D)_{t=2} = \sum_{k \in \{G,I,A\}} (p_k) \times (NPV_{D,jk})_{t=2} \quad (28b)$$

$$(PV)_{t=1} = \max\left(\frac{q_U(NPV_{U,j})_{t=2} + q_D(NPV_{D,j})_{t=2}}{1 + d_{rf}}, \text{option value}\right) \quad (28c)$$

$$(\Delta_j)_{t=1} = \frac{(NPV_{U,j})_{t=2} - (NPV_{D,j})_{t=2}}{S_U - S_D} \quad (28d)$$

where $p_k$ represents the probability of β with k∈{G, I, A}.

At t=0, both private uncertainties are unresolved. In particular, FIG. 11(c) shows the last node in the backward recursion. While the production decline β is completely unresolved, the initial oil fraction $f_{init}$ is unresolved at t=0, but resolved at t=1. The recursion becomes $$(NPV_U)_{t=1} = \sum_{j \in \{L,M,H\}} (p_j) \times (NPV_{U,j})_{t=1} \quad (29a)$$

$$(NPV_D)_{t=1} = \sum_{j \in \{L,M,H\}} (p_j) \times (NPV_{D,j})_{t=1} \quad (29b)$$

$$(PV)_{t=0} = \max\left(\frac{q_U(NPV_U)_{t=1} + q_D(NPV_D)_{t=1}}{1 + d_{rf}}, \text{option value}\right) \quad (29c)$$

$$(\Delta)_{t=0} = \frac{(NPV_U)_{t=1} - (NPV_D)_{t=1}}{S_U - S_D} \quad (29d)$$

where $p_j$ represents the probability of $f_{init}$ with j∈{L, M, H}.

While both private uncertainties are unresolved at t=0, the summations in equations (29a) and (29b) are performed only over the index j corresponding to $f_{init}$. The reason for not summing over both j and k is that only $f_{init}$ is resolved at t=1, while the production decline β is still completely unknown. So, at t=1, there are no distinct observable states corresponding to the different values of β. It should be appreciated that in the case where both private uncertainties are resolved in the same period, summations are performed over both j and k. Thus, the form of the backward recursion depends entirely on the resolved private uncertainties during the time period in question.

The results from the backward recursion, with and without option, are shown in Table 4 below.

TABLE 4

Results of the backward recursion, with and without salvage option.

| Backward Recursion Results | Value |
|---|---|
| With salvage option | US$63.66 × $10^7$ |
| Without salvage option | US$58.06 × $10^7$ |
| Difference (value of the option) | US$5.60 × $10^7$ |

As with the embodiment relating to carbon dioxide sequestration, a forward simulation may be run on the oilfield analysis to demonstrate that the valuation computed from backward recursion could actually be realized from an ensemble of projects sampling the private uncertainty. Use of the simulation obviously presumes that the model is correct, but this assumption is already implicit in the valuation itself. In a sense, the forward simulation simply shows that, given the model, the whole picture is consistent.

Figure 12:
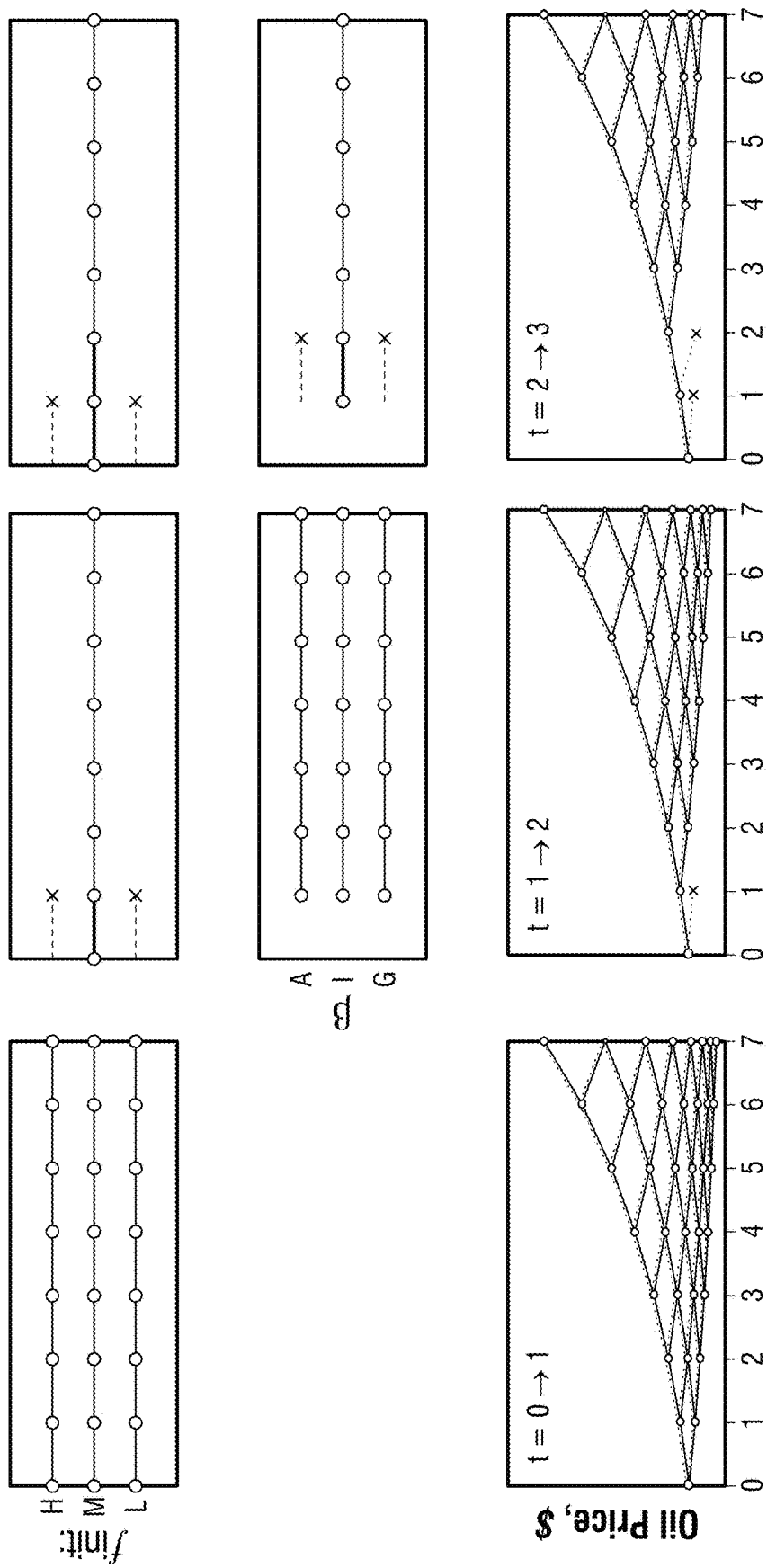
FIG. 12 is an illustration of the first three steps of a forward simulation process.

The forward simulations are performed separately for each state of the private uncertainty and each state of market uncertainty (price path), but do not assume knowledge of which state is in effect until that knowledge is revealed by events. In other words, the simulation proceeds exactly as the operation of the project would proceed in the real world for the corresponding state of the private and market uncertainty. The first three steps of this process, for the specific case of oil price path U→U→D→U→U→D→U and private uncertainty $f_{init}$=M and β=I, are illustrated in FIG. 12. Black lines, with open circles at each time step, represent feasible present and future states. Bold black lines represent paths traversed once an uncertainty has been resolved. Dashed grey lines indicate those that were once feasible but are no longer so due to resolution of an uncertainty.

Table 5 presents the forward simulation results without salvage option for four different oil price paths. All results shown pertain to the specific state of the private uncertainty: $f_{init}$=M and β=I. Values for Δ-hedge (in units of bbls×$10^6$), computed from the backward recursion, are shown in this table. Cash flows (CF) and wealth, with and without Δ-hedge, are also shown. The second row in each column presents the value of the hedging coefficient Δ obtained from the backward recursion solution. Only results pertaining to private uncertainty 'MI' are shown (i.e., $f_{init}$=M and β=I). Eight further similar results tables—one for each state of private uncertainty—need to be generated in order to compute the mean wealth values generated without options in place (see Tables 7 and 8).

'Salvage CF.' This table also applies only to the private uncertainty states: $f_{init}$=M and β=I, and eight further similar results tables need to be generated (one for each state of private uncertainty) in order to compute the mean wealth values and cash flows (CF) with the salvage option in place (see Tables 7 and 8). Again, the line directly under each price path is the value of the hedging coefficient Δ taken from the backward recursion solution. If the Δ value is absent, this means that the option should be exercised, and there is a non-zero entry in the 'Salvage CF' row. An empty space in any column in Table 6, where t≥1, indicates that the salvage option was exercised (the asset was sold) hence no further cash flows from the asset supply, although values for wealth

TABLE 5

Forward simulation results without the salvage
option present for four possible oil price paths
Values of Forward Simulation WITHOUT Salvage Option of time, t
(All Units are stated in US $ × $10^7$ except Δ-hedge which is stated in bbls × $10^6$)
All Values Apply to Private Uncertainty in State 'MI' $f_{init}$ = 'M' and β = 'I')

|  | t = 0 | t = 1 | t = 2 | t = 3 | t = 4 | t = 5 | t = 6 | t = 7 |
|---|---|---|---|---|---|---|---|---|
| Oil Price Path |  | U | U | D | U | U | D | U |
| Δ-hedge (bbls × $10^6$) | 17.40 | 13.68 | 10.23 | 7.512 | 5.184 | 3.188 | 1.474 |  |
| Net CF |  | 19.83 | 21.50 | 14.08 | 15.36 | 16.74 | 10.64 | 11.71 |
| Settlement CF |  | −19.84 | −19.63 | 15.12 | −11.43 | −9.925 | 6.286 | −2.993 |
| CF (no Δ-hedge) |  | 19.83 | 21.50 | 14.08 | 15.36 | 16.74 | 10.64 | 11.71 |
| CF (with Δ-hedge) |  | −0.005 | 1.871 | 29.19 | 3.926 | 6.817 | 16.93 | 8.716 |
| Wealth (no Δ-hedge) |  | 19.83 | 42.17 | 58.04 | 75.87 | 95.83 | 110.5 | 127.0 |
| Wealth (with Δ-hedge) |  | −0.005 | 1.866 | 31.14 | 36.39 | 44.75 | 63.58 | 75.00 |
| Oil Price Path |  | D | D | U | D | U | U | U |
| Δ-hedge (bbls × $10^6$) | 17.40 | 13.68 | 10.23 | 7.512 | 5.184 | 3.188 | 1.474 |  |
| Net CF |  | 11.79 | 7.115 | 7.896 | 4.307 | 4.908 | 5.561 | 6.265 |
| Settlement CF |  | 16.24 | 10.77 | −8.296 | 6.274 | −4.459 | −3.450 | −2.006 |
| CF (no Δ-hedge) |  | 11.79 | 7.115 | 7.896 | 4.307 | 4.908 | 5.561 | 6.265 |
| CF (with Δ-hedge) |  | 28.03 | 17.89 | −0.400 | 10.58 | 0.449 | 2.111 | 4.259 |
| Wealth (no Δ-hedge) |  | 11.79 | 19.41 | 28.13 | 33.63 | 39.97 | 47.23 | 55.50 |
| Wealth (with Δ-hedge) |  | 28.03 | 47.11 | 48.71 | 61.36 | 64.42 | 69.27 | 76.47 |
| Oil Price Path |  | U | U | U | U | U | D | D |
| Δ-hedge (bbls × $10^6$) | 17.40 | 13.68 | 10.23 | 7.512 | 5.184 | 3.188 | 1.474 |  |
| Net CF |  | 19.83 | 21.50 | 23.29 | 25.23 | 27.31 | 18.23 | 11.71 |
| Settlement CF |  | −19.84 | −19.63 | −18.46 | −17.06 | −14.81 | 9.377 | 3.656 |
| CF (no Δ-hedge) |  | 19.83 | 21.50 | 23.29 | 25.23 | 27.31 | 18.23 | 11.71 |
| CF (with Δ-hedge) |  | −0.005 | 1.871 | 4.832 | 8.174 | 12.50 | 27.61 | 15.36 |
| Wealth (no Δ-hedge) |  | 19.83 | 42.17 | 67.26 | 95.35 | 126.7 | 150.3 | 168.4 |
| Wealth (with Δ-hedge) |  | −0.005 | 1.866 | 6.777 | 15.24 | 28.39 | 57.20 | 75.00 |
| Oil Price Path |  | D | U | D | U | D | D | D |
| Δ-hedge (bbls × $10^6$) | 17.40 | 13.68 | 10.23 | 7.512 | 5.184 | 3.188 | 1.474 |  |
| Net CF |  | 11.79 | 12.89 | 7.896 | 8.742 | 4.908 | 2.152 | 0.170 |
| Settlement CF |  | 16.24 | −13.16 | 10.13 | −7.663 | 5.447 | 2.824 | 1.101 |
| CF (no Δ-hedge) |  | 11.79 | 12.89 | 7.896 | 8.742 | 4.908 | 2.152 | 0.170 |
| CF (with Δ-hedge) |  | 28.03 | −0.269 | 18.03 | 1.079 | 10.36 | 4.977 | 1.272 |
| Wealth (no Δ-hedge) |  | 11.79 | 25.18 | 34.14 | 44.34 | 51.13 | 55.46 | 57.98 |
| Wealth (with Δ-hedge) |  | 28.03 | 28.95 | 48.21 | 51.34 | 63.88 | 71.57 | 75.88 |

Table 6 presents a similar set of data as Table 5 corresponding to simulation results, but this time with the salvage option as indicated by the inclusion of the third row labeled increase at the risk-free rate, $d_{rf}$. The complete valuation computation will generate similar tables for all states of private uncertainty.

TABLE 6

Forward simulation results with the salvage option present for the same four oil
price paths presented previously in Table 5.
Values of Forward Simulation WITH Salvage Option of time, t
(All Units are stated in US $ × $10^7$ except Δ-hedge which is stated in bbls × $10^6$)
All Values Apply to Private Uncertainty in State 'MI' $f_{init}$ = M and β = I)

|  | t = 0 | t = 1 | t = 2 | t = 3 | t = 4 | t = 5 | t = 6 | t = 7 |
|---|---|---|---|---|---|---|---|---|
| Oil Price Path |  | U | U | D | U | U | D | U |
| Δ-hedge (bbls × $10^6$) | 15.19 | 12.56 | 9.694 | 6.303 | 5.184 | 3.188 | 1.474 |  |
| Salvage CF |  | 0.0 | 0.0 | 0.0 | 0.0 | 0.0 | 0.0 | 0.0 |
| Net CF |  | 19.83 | 21.50 | 14.08 | 15.36 | 16.74 | 10.64 | 11.71 |

TABLE 6-continued

Forward simulation results with the salvage option present for the same four oil price paths presented previously in Table 5.
Values of Forward Simulation WITH Salvage Option of time, t
(All Units are stated in US $ × $10^7$ except Δ-hedge which is stated in bbls × $10^6$)
All Values Apply to Private Uncertainty in State 'MI' ($f_{init}$ = M and β = I)

|  | t = 0 | t = 1 | t = 2 | t = 3 | t = 4 | t = 5 | t = 6 | t = 7 |
|---|---|---|---|---|---|---|---|---|
| Settlement CF |  | −17.33 | −18.01 | 14.32 | −9.593 | −9.925 | 6.286 | −2.993 |
| CF (no Δ-hedge) |  | 19.83 | 21.50 | 14.08 | 15.36 | 16.74 | 10.64 | 11.71 |
| CF (with Δ-hedge) |  | 2.506 | 3.483 | 28.40 | 5.766 | 6.817 | 16.93 | 8.716 |
| Wealth (no Δ-hedge) |  | 19.83 | 42.17 | 58.04 | 75.87 | 95.83 | 110.5 | 127.0 |
| Wealth (with Δ-hedge) |  | 2.506 | 6.096 | 34.75 | 42.00 | 50.60 | 69.68 | 81.36 |
| Oil Price Path |  | D | D | U | D | U | U | U |
| Δ-hedge (bbls × $10^6$) | 15.19 | 10.29 | 4.941 | 4.342 |  |  |  |  |
| Salvage CF |  | 0.0 | 0.0 | 0.0 | 15.36 |  |  |  |
| Net CF |  | 11.79 | 7.115 | 7.896 | 4.307 |  |  |  |
| Settlement CF |  | 14.18 | 8.100 | −4.006 | 3.626 |  |  |  |
| CF (no Δ-hedge) |  | 11.79 | 7.115 | 7.896 | 19.67 |  |  |  |
| CF (with Δ-hedge) |  | 25.97 | 15.22 | 3.890 | 23.29 |  |  |  |
| Wealth (no Δ-hedge) |  | 11.79 | 19.41 | 28.13 | 48.99 | 51.07 | 53.24 | 55.50 |
| Wealth (with Δ-hedge) |  | 25.97 | 42.29 | 47.98 | 73.31 | 76.43 | 79.68 | 83.06 |
| Oil Price Path |  | U | U | U | U | U | D | D |
| Δ-hedge (bbls × $10^6$) | 15.19 | 12.56 | 9.694 | 7.512 | 5.184 | 3.188 | 1.474 |  |
| Salvage CF |  | 0.0 | 0.0 | 0.0 | 0.0 | 0.0 | 0.0 | 0.0 |
| Net CF |  | 19.83 | 21.50 | 23.29 | 25.23 | 27.31 | 18.23 | 11.71 |
| Settlement CF |  | −17.33 | −18.01 | −17.49 | −17.06 | −14.81 | 9.377 | 3.656 |
| CF (no Δ-hedge) |  | 19.83 | 21.50 | 23.29 | 25.23 | 27.31 | 18.23 | 11.71 |
| CF (with Δ-hedge) |  | 2.506 | 3.483 | 5.802 | 8.174 | 12.50 | 27.61 | 15.36 |
| Wealth (no Δ-hedge) |  | 19.83 | 42.17 | 67.26 | 95.35 | 126.7 | 150.3 | 168.4 |
| Wealth (with Δ-hedge) |  | 2.506 | 6.096 | 12.16 | 20.85 | 34.24 | 63.30 | 81.36 |
| Oil Price Path |  | D | U | D | U | D | D | D |
| Δ-hedge (bbls × $10^6$) | 15.19 | 10.29 | 8.164 | 4.342 | 2.466 |  |  |  |
| Salvage CF |  | 0.0 | 0.0 | 0.0 | 0.0 | 12.29 |  |  |
| Net CF |  | 11.79 | 12.89 | 7.896 | 8.742 | 4.908 |  |  |
| Settlement CF |  | 14.18 | −9.893 | 8.086 | −4.429 | 2.591 |  |  |
| CF (no Δ-hedge) |  | 11.79 | 12.89 | 7.896 | 8.742 | 17.20 |  |  |
| CF (with Δ-hedge) |  | 25.97 | 2.994 | 15.98 | 4.313 | 19.79 |  |  |
| Wealth (no Δ-hedge) |  | 11.79 | 25.18 | 34.14 | 44.34 | 63.42 | 66.11 | 68.92 |
| Wealth (with Δ-hedge) |  | 25.97 | 30.07 | 47.33 | 53.66 | 75.72 | 78.94 | 82.30 |

The results of the forward simulations are summarized in Tables 7 and 8. These table list accumulated wealths (W) computed for each possible state of private uncertainty and the same price paths considered in Tables 5 and 6. The results are shown both with and without the salvage option, and also with and without hedging. All results applied to states of private uncertainty 'MI' correspond precisely to those in Tables 5 and 6. In Table 7, a summary of wealth (W) is provided with and without the salvage option present, and also with and without hedging for the oil price Path #1 U→U→D→U→U→D→U and Path #2 D→D→U→D→U→U→U. In Table 8, the same summary is provided for Path #3 U→U→U→U→U→D→D and Path #4 D→U→D→U→D→D→D. In both tables, all possible combinations of private uncertainty are shown along with the four different oil price paths presented earlier in Tables 5 & 6. The discounted means were obtained using $d_{rf}$=4.25% such that PV=W/(1+$d_{rf}$)$^7$ with 7 being the number of years that these wealths have accrued.

TABLE 7

Summary of Wealths (W), with and without the salvage option present
and with and without hedging for Paths #1 and #2

| State of Private Uncertainty | | Oil Price Path U → U → D → U → U → D → U Wealth, US $ × $10^7$ | | | | Oil Price Path D → U → D → U → D → D → D Wealth, US $ × $10^7$ | | | |
|---|---|---|---|---|---|---|---|---|---|
| | | No Option | | With Option | | No Option | | With Option | |
| $f_{init}$ | β | no Hedging | w/Hedging | no Hedging | w/Hedging | no Hedging | w/Hedging | no Hedging | w/Hedging |
| H | A | 193.90 | 134.90 | 193.90 | 139.60 | 93.90 | 109.30 | 93.90 | 107.90 |
| H | I | 156.30 | 99.68 | 156.30 | 105.10 | 72.24 | 93.24 | 69.62 | 97.01 |
| H | G | 129.10 | 73.98 | 129.10 | 81.47 | 56.74 | 81.53 | 61.23 | 91.70 |
| M | A | 158.90 | 104.90 | 158.90 | 110.20 | 73.91 | 90.11 | 73.91 | 89.78 |
| M | I | 127.00 | 75.00 | 127.00 | 81.36 | 55.50 | 76.47 | 55.50 | 83.06 |
| M | G | 103.80 | 53.16 | 103.80 | 62.72 | 42.32 | 66.52 | 52.56 | 80.74 |
| L | A | 123.90 | 74.98 | 123.90 | 81.65 | 53.91 | 70.94 | 51.11 | 73.83 |
| L | I | 97.60 | 50.32 | 97.60 | 59.30 | 38.75 | 59.70 | 47.03 | 71.69 |

TABLE 7-continued

Summary of Wealths (W), with and without the salvage option present
and with and without hedging for Paths #1 and #2

| State of Private Uncertainty | | Oil Price Path U → U → D → U → U → D → U Wealth, US $ × 10⁷ | | | | Oil Price Path D → U → D → U → D → D → D Wealth, US $ × 10⁷ | | | |
|---|---|---|---|---|---|---|---|---|---|
| | | No Option | | With Option | | No Option | | With Option | |
| $f_{init}$ | β | no Hedging | w/Hedging | no Hedging | w/Hedging | no Hedging | w/Hedging | no Hedging | w/Hedging |
| L | G | 78.55 | 32.33 | 82.73 | 45.32 | 27.90 | 51.51 | 46.30 | 70.96 |
| Mean | | 129.90 | 77.70 | 130.40 | 85.19 | 52.24 | 77.70 | 61.24 | 85.19 |
| Discounted Mean | | 97.07 | 58.06 | 97.44 | 63.66 | 42.77 | 58.06 | 45.76 | 63.66 |

TABLE 8

Summary of Wealths (W), with and without the salvage option present,
and also with and without hedging for Paths #3 and #4

| State of Private Uncertainty | | Oil Price Path U → U → U → U → U → D → D Wealth, US $ × 10⁷ | | | | Oil Price Path D → U → D → U → D → D → D Wealth, US $ × 10⁷ | | | |
|---|---|---|---|---|---|---|---|---|---|
| | | No Option | | With Option | | No Option | | With Option | |
| $f_{init}$ | β | no Hedging | w/Hedging | no Hedging | w/Hedging | no Hedging | w/Hedging | no Hedging | w/Hedging |
| H | A | 255.10 | 134.90 | 255.10 | 139.60 | 93.57 | 116.30 | 93.57 | 117.30 |
| H | I | 205.10 | 99.68 | 205.10 | 105.10 | 75.17 | 92.54 | 83.90 | 96.18 |
| H | G | 168.70 | 73.98 | 168.70 | 81.47 | 61.50 | 75.22 | 74.41 | 83.11 |
| M | A | 210.90 | 104.90 | 210.90 | 110.20 | 73.63 | 96.06 | 73.63 | 98.67 |
| M | I | 168.40 | 75.00 | 168.40 | 81.36 | 57.98 | 75.88 | 68.92 | 82.30 |
| M | G | 137.50 | 53.16 | 137.50 | 62.72 | 46.36 | 61.16 | 60.86 | 72.61 |
| L | A | 166.80 | 74.98 | 166.80 | 81.65 | 53.68 | 75.84 | 62.40 | 81.95 |
| L | I | 131.70 | 50.32 | 131.70 | 59.30 | 40.80 | 59.22 | 53.95 | 70.16 |
| L | G | 106.30 | 32.33 | 106.30 | 45.32 | 31.23 | 47.09 | 50.12 | 64.37 |
| Mean | | 172.30 | 77.70 | 172.30 | 85.19 | 59.32 | 77.70 | 69.09 | 85.19 |
| Discounted Mean | | 128.75 | 58.06 | 128.75 | 63.66 | 44.33 | 58.06 | 51.63 | 63.66 |

It is seen that both with and without the salvage option present, the mean values with hedging are identical irrespective of the price path, and when discounted back to t=0, this value is equal to the valuation obtained by backward recursion. More particularly, when hedging is applied, the average wealth over the nine private uncertainty states is the same for each price path, i.e., $85.19×10^7$ with option and $77.70×10^7$ without option. The same result is not obtained if the hedging is not applied. Also, when discounted back to t=0, these values reduce to $63.66×10^7$ and $58.06×10^7$, respectively, which are precisely the values obtained from the backward recursion. These results demonstrate that the computed valuation may actually be obtained from an ensemble of projects, provided the hedging strategy is employed. In other words, by using the hedging/exercise strategy dictated by the backward recursion solution, the same expected discounted value may be obtained for each price path. In addition, it is seen that the average value obtained by using the computed exercise strategy is higher than the average value obtained if the option is never exercised (which is just the no-option case).

There have been described and illustrated herein embodiments of methods for assigning a value to a geological asset or information relating thereto in the presence of private and public sources of uncertainties. While particular embodiments have been described, it is not intended that the disclosure be limited thereto, and it is intended that the claims be as broad in scope as the art will allow and that the specification be read likewise. Thus, while particular examples of geological assets (a formation containing oil, and a formation suitable for carbon dioxide sequestration) have been described, it will be appreciated that the methods could be used to assign a value to other geological assets. Similarly, while particular examples of information relating to a geological asset have been described, it will be appreciated that the methods could be used to assign a value to other information. Also, while particular public and private uncertainties were described, it will be appreciated that the methods can be used in conjunction with different uncertainties. It will therefore be appreciated by those skilled in the art that yet other modifications could be made. Accordingly, all such modifications are intended to be included within the scope of this disclosure as defined in the following claims. In the claims, means-plus-function clauses, if any, are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for exploiting a hydrocarbon reservoir in the presence of private and public sources of uncertainties, the method comprising:

a) performing a measurement on the hydrocarbon reservoir to obtain data associated with a physical property of the hydrocarbon reservoir, wherein the measurement is made using at least one of (i) well logging, (ii) a seismic survey, and (iii) an electromagnetic survey;

b) defining a public uncertainty associated with the hydrocarbon reservoir and a private uncertainty associated with the hydrocarbon reservoir, wherein the private uncertainty comprises uncertainty associated with the physical property of the hydrocarbon reservoir;

c) constructing a multi-dimensional lattice incorporating the private uncertainty and the public uncertainty, the lattice having a plurality of time-based nodes;

d) assigning risk neutral probabilities to each public uncertainty;

e) assigning subjective probabilities to each private uncertainty;

f) performing a backward recursion through the multi-dimensional lattice including keeping a tally of delta hedging coefficients at each time-based node resulting from the risk neutral probabilities and the subjective probabilities to obtain a value for the hydrocarbon reservoir, wherein each time-based node represents a potential operation to be performed on the hydrocarbon reservoir;

g) developing an operational map for exploiting the hydrocarbon reservoir using the delta hedging coefficients and the value of the hydrocarbon reservoir; and h) exploiting the hydrocarbon reservoir by implementing the operational map, wherein exploiting the hydrocarbon reservoir comprises at least one of (i) drilling a well within a formation that contains the hydrocarbon reservoir, (ii) producing hydrocarbons from the hydrocarbon reservoir, and (iii) performing a measurement on the hydrocarbon reservoir to obtain data associated with a physical property of the hydrocarbon reservoir;

wherein processes b) through g) are each performed by a processor.

2. A method according to claim 1, wherein the delta hedging coefficients are computed at the nodes of the lattice using the delta-hedge equation $$(\Delta)_{t-1} = \frac{(NPV_U)_t - (NPV_D)_t}{(S_U)_t - (S_D)_t}$$

where t is a time index, $NPV_U$ is an up net present value, $NPV_D$ is a down-state net present value, $S_U$ is an up price of a quantity associated with the hydrocarbon reservoir, and $S_D$ is a down price of the quantity.

3. A method according to claim 2, wherein the quantity is a quantity of hydrocarbon, and the public uncertainty comprises the financial instrument associated with the future price of hydrocarbon and the risk neutral probabilities.

4. A method according to claim 3, wherein the private uncertainty includes an initial hydrocarbon fraction, $f_{init}$, and a decline rate, $\beta$.

5. A method according to claim 1, wherein the subjective probabilities are assigned using an average over the private uncertainties.

6. A method according to claim 1, wherein the subjective probabilities are assigned using probability maps.

7. A method according to claim 1, further comprising conducting a forward simulation through the multi-dimensional lattice utilizing the delta hedging coefficients to validate the value for the hydrocarbon reservoir.

8. A method according to claim 1, further comprising:
identifying an option associated with the hydrocarbon reservoir and associating the option with the multi-dimensional lattice;
performing backward recursion through the multi-dimensional lattice with the associated option including keeping a tally of any of the option exercised in order to obtain the value for the hydrocarbon reservoir with the option;
obtaining a value for the option by subtracting the value for the hydrocarbon reservoir from the value for the hydrocarbon reservoir with the option.

9. A method according to claim 1, wherein the uncertainty associated with the physical property of the hydrocarbon reservoir comprises at least one of (i) uncertainty associated with a permeability of the hydrocarbon reservoir, (ii) uncertainty associated with a rock type of the hydrocarbon reservoir, (iii) uncertainty associated with a reserve size of the hydrocarbon reservoir, and (iv) uncertainty associated with quality of hydrocarbons within the hydrocarbon reservoir.

10. A method according to claim 1, wherein the private uncertainty comprises uncertainty associated with a cost of producing hydrocarbons from the hydrocarbon reservoir.

11. A method for performing an operation on a geological asset in the presence of private and public sources of uncertainties, the method comprising:

a) performing a measurement on the geological asset to obtain data associated with a physical property of the geological asset, wherein the measurement is made using at least one of (i) well logging, (ii) a seismic survey, and (iii) an electromagnetic survey;

b) defining a public uncertainty associated with the geological asset and a private uncertainty associated with the geological asset, wherein the private uncertainty comprises uncertainty associated with the physical property of the geological asset;

c) constructing a multi-dimensional lattice incorporating the private uncertainty and the public uncertainty, the lattice having a plurality of time-based nodes;

d) assigning risk neutral probabilities to each public uncertainty;

e) assigning subjective probabilities to each private uncertainty;

f) performing a backward recursion through the multi-dimensional lattice including keeping a tally of delta hedging coefficients at each time-based node resulting from the risk neutral probabilities and subjective probabilities in order to obtain a value for the geological asset;

g) identifying a potential operation to be performed on the geological asset;

h) revising the subjective probabilities pertaining to the private uncertainty based on the potential operation to be performed on the geological asset;

i) constructing a new multi-dimensional lattice incorporating the revised subjective probabilities;

j) performing a backward recursion through the new multi-dimensional lattice including keeping a tally of delta hedging coefficients at each time-based node resulting from the risk neutral probabilities and the revised subjective probabilities in order to obtain a new value for the geological asset;

k) computing a value for the potential operation to be performed on the geological asset from the value for the geological asset and the new value for the geological asset; and l) performing the potential operation on the geological asset based on the value of the potential operation, wherein performing the potential operation on the geological asset comprises at least one of (i) drilling a well within a formation containing the geological asset, (ii) producing hydrocarbons from the geological asset, and (iii) performing a measurement on the geological asset to obtain data associated with a physical property of the geological asset;

wherein processes b) through f) and h) through k) are each performed by a processor.

12. A method according to claim 11, wherein the computing comprises subtracting the value for the geological asset from the new value for the geological asset.

13. A method according to claim 11, further comprising:
repeating processes g) through k) a plurality of times for different new potential operations on the geological asset; and
optimizing new potential operation valuation by selecting a maximum value of the values obtained by the computing.

14. A method according to claim 13, wherein the computing comprises utilizing a model of a formation containing the geological asset.

15. A method according to claim 14, wherein the potential operation on the geological asset comprises a measurement in a well traversing a formation containing the geological asset and a specific time to perform the measurement.

16. A method according to claim 14, wherein the potential operation on the geological asset comprises drilling a monitoring well in a formation containing the geological asset and a location of the monitoring well.

17. A method according to claim 14, wherein the potential operation on the geological asset comprises a specific measurement or set of measurements related to the geological asset in a well traversing a formation containing the geological asset.

18. A method according to 14, wherein the potential operation on the geological asset comprises a specific measurement or set of measurements related to the geological asset taken at a specific time at a specific location and containing the geological asset.

19. A method according to claim 11, wherein performing the potential operation on the geological asset comprises at least one of (i) drilling a monitoring well at a location indicated by the potential operation, and (ii) taking a measurement related to the geological asset in a formation containing the geological asset.

20. A method according to claim 11, wherein the geological asset comprises a hydrocarbon reservoir.

21. A method according to claim 11, wherein the geological asset comprises a formation suitable for carbon dioxide sequestration.

* * * * *